US010749950B2

(12) United States Patent
Kim et al.

(10) Patent No.: US 10,749,950 B2
(45) Date of Patent: Aug. 18, 2020

(54) METHOD AND ELECTRONIC DEVICE FOR PROVIDING DATA

(71) Applicant: Samsung Electronics Co., Ltd., Suwon-si, Gyeonggi-do (KR)

(72) Inventors: Jung-Yong Kim, Gwangju (KR); Samirkant Sahu, Suwon-si (KR); Hun-Je Yeon, Seoul (KR); Jung-Hyun Oh, Seongnam-si (KR); Min-Suk Choi, Suwon-si (KR); Seong-Il Hahm, Yongin-si (KR); Boo-Gun Min, Suwon-si (KR); Hee-Won Park, Seoul (KR); Jae-Sick Shin, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 480 days.

(21) Appl. No.: 14/839,196

(22) Filed: Aug. 28, 2015

(65) Prior Publication Data
US 2016/0065666 A1 Mar. 3, 2016

(30) Foreign Application Priority Data

Sep. 1, 2014 (KR) .......................... 10-2014-0115702

(51) Int. Cl.
*H04L 29/08* (2006.01)
(52) U.S. Cl.
CPC ........ *H04L 67/1051* (2013.01); *H04L 67/303* (2013.01); *H04L 67/04* (2013.01)
(58) Field of Classification Search
CPC ....... H04L 41/12; H04L 67/28; H04L 67/104; H04W 84/18; H04W 67/12
See application file for complete search history.

(56) References Cited

U.S. PATENT DOCUMENTS

| 6,507,907 B1* | 1/2003 | Takahashi | H04N 7/163 348/E7.061 |
| 9,454,898 B2* | 9/2016 | Kim | G08C 17/02 |
| 9,594,354 B1* | 3/2017 | Kahn | G04G 21/00 |
| 2004/0040023 A1* | 2/2004 | Ellis | G06F 8/60 717/178 |
| 2007/0091838 A1* | 4/2007 | Kobayashi | H04L 45/42 370/328 |
| 2008/0002723 A1* | 1/2008 | Pusateri | H04L 45/00 370/401 |
| 2008/0046592 A1 | 2/2008 | Gilhuly et al. | |
| 2009/0112523 A1* | 4/2009 | Townsend | G08B 21/0446 702/187 |

(Continued)

FOREIGN PATENT DOCUMENTS

| EP | 2290896 A1 | 3/2011 |
| GB | 2510512 A | 8/2014 |
| WO | 2013/168994 A1 | 11/2013 |

*Primary Examiner* — Esther B. Henderson
(74) *Attorney, Agent, or Firm* — Jefferson IP Law, LLP

(57) ABSTRACT

A method of providing data by a first electronic device is provided. The method includes connecting with a plurality of electronic devices, transmitting information on data that is able to be provided to the plurality of electronic devices by the first electronic device, to a second electronic device from among the plurality of electronic devices that is selected as a host device for transmitting the data to at least one of the plurality of electronic devices instead of the first electronic device, and transmitting the data to the second electronic device.

20 Claims, 14 Drawing Sheets

(56) References Cited

U.S. PATENT DOCUMENTS

| | | | |
|---|---|---|---|
| 2010/0077087 A1* | 3/2010 | Roy | H04L 29/1249 709/228 |
| 2010/0332657 A1 | 12/2010 | Elyashev et al. | |
| 2012/0201158 A1 | 8/2012 | Geirhofer et al. | |
| 2012/0250581 A1 | 10/2012 | Bilcu et al. | |
| 2013/0124691 A1* | 5/2013 | Suryavanshi | H04L 67/06 709/219 |
| 2013/0297739 A1* | 11/2013 | Faihe | G06Q 10/101 709/217 |
| 2013/0315155 A1* | 11/2013 | Foti | H04W 72/0406 370/329 |
| 2014/0025794 A1 | 1/2014 | Bartholomay et al. | |
| 2014/0195600 A1 | 7/2014 | Hartrick et al. | |
| 2014/0222941 A1 | 8/2014 | Tabone et al. | |
| 2014/0323162 A1* | 10/2014 | Ezra | G01S 5/0072 455/457 |
| 2015/0180963 A1* | 6/2015 | Luecke | H04L 67/06 709/203 |
| 2015/0237077 A1* | 8/2015 | Suryavanshi | H04L 65/1083 709/204 |
| 2015/0243246 A1* | 8/2015 | Mun | G06F 9/44505 345/520 |
| 2015/0285659 A1* | 10/2015 | Curtis | G01C 22/006 702/97 |
| 2015/0358395 A1* | 12/2015 | Benson | H04L 67/32 709/219 |
| 2016/0006801 A1* | 1/2016 | Ueda | H04L 67/1095 709/204 |

\* cited by examiner

METHOD AND ELECTRONIC DEVICE FOR PROVIDING DATA

CROSS-REFERENCE TO RELATED APPLICATION(S)

This application claims the benefit under 35 U.S.C. § 119(a) of a Korean patent application filed on Sep. 1, 2014 in the Korean Intellectual Property Office and assigned Serial number 10-2014-0115702, the entire disclosure of which is hereby incorporated by reference.

TECHNICAL FIELD

The present disclosure relates to an electronic device having a communication function. More particularly, the present disclosure relates to a method and device for transmitting data to a neighboring device.

BACKGROUND

Electronic devices (e.g., smart phones) may provide various application functions, such as a clock, a calendar, a memo, search, a map, news, and real-time camera functions, as well as supporting a communication function. Users may operate the various functions using the electronic devices.

The electronic devices may be used through connections with various neighboring devices, such as wearable devices, Wi-Fi/Bluetooth accessories, tablet PCs, home appliances, and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device to transfer information, the electronic device excessively consumes a battery thereof, which causes a reduction in the life time of the electronic device.

In accordance with an aspect of the present disclosure, a method of providing data by a first electronic device is provided. The method includes connecting with a plurality of electronic devices, transmitting information on data that may be provided to the plurality of electronic devices by the first electronic device, to a second electronic device from among the plurality of electronic devices that is selected as a host device for transmitting the data to at least one of the plurality of electronic devices instead of the first electronic device, and transmitting the data to the second electronic device.

In accordance with an aspect of the present disclosure, the first electronic device is provided. The first electronic device includes a communication interface for a communication connection with another electronic device, and a processor configured to connect with a plurality of electronic devices through the communication interface, transmit information on data which may be provided to the plurality of electronic devices by the first electronic device, through the communication interface to a second electronic device from among the plurality of electronic devices that is selected as a host device for transmitting the data to at least one of the plurality of electronic devices instead of the first electronic device, and transmit the data to the second electronic device through the communication interface.

In accordance with an aspect of the present disclosure, a method of providing data by the second electronic device is provided. The method includes connecting with the first electronic device, receiving, from the first electronic device, information on data that may be provided to the second electronic device selected as the host device by the first electronic device and at least one electronic device, receiving the data from the first electronic device, and transmitting the data to the at least one electronic device.

In accordance with an aspect of the present disclosure, the second electronic device is provided. The second electronic device includes a communication interface for a communication connection with another electronic device, and a processor configured to connect with the first electronic device through the communication interface, to receive information on data that may be provided to the second electronic device selected as the host device by the first electronic device and at least one electronic device, through the communication interface from the first electronic device, to receive the data through the communication interface from the first electronic device, and transmit the data through the communication interface to the at least one electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
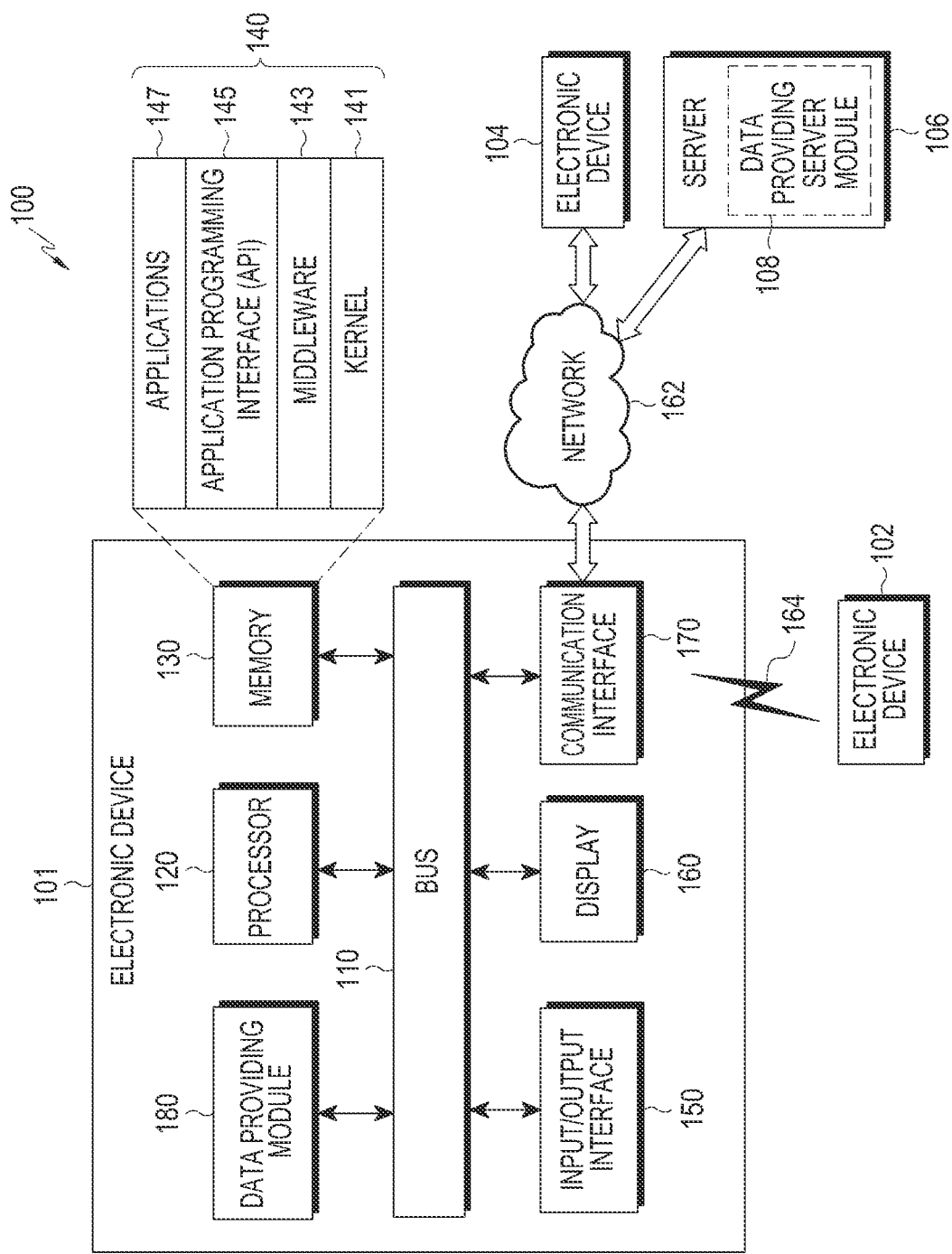
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), the element may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that may perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a moving picture experts group (MPEG_1 or MPEG-2) audio layer III (MP3) player, a mobile medical appliance, a camera, and a wearable device (e.g., a head-mounted-device (HMD) such as electronic glasses, electronic clothes, an electronic bracelet, an electronic necklace, an electronic accessory, electronic tattoos, or a smart watch).

According to some embodiments, the electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device and/or the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internes device of things (e.g., a light bulb, various sensors, an electric meter or a gas meter, a sprinkler device, a fire alarm, a thermostat, a streetlamp, a toaster, a sporting goods, a hot water tank, a heater, a boiler, and/or the like).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to an embodiment of the present disclosure.

Referring to FIG. 1, an electronic device 101 within a network environment 100, according to various embodiments, is disclosed. The electronic device 101 may include a bus 110, a processor 120, a memory 130, an input/output interface 150, a display 160, a communication interface 170, and a data providing module 180. In a certain embodiment, the electronic device 101 may omit at least one of the elements, or may additionally include other elements.

The bus 110 may include, for example, a circuit for interconnecting the elements 120, 130, and 150 to 180 and transferring communication (e.g., control messages and/or data) between the elements.

The processor 120 may include one or more of a CPU, an AP, and a communication processor (CP). The processor 120, for example, may control at least one other element of the electronic device 101 and/or execute operations or data processing relating to communication. The processor 120 may be referred to as a controller, or may include the controller as a part thereof.

The memory 130 may include a volatile memory and/or a non-volatile memory. The memory 130 may store, for example, instructions or data related to at least one other element of the electronic device 101. According to an embodiment, the memory 130 may store software and/or a program 140. The program 140 may include, for example, a kernel 141, middleware 143, an application programming interface (API) 145, and/or application programs 147 (or "applications"). At least some of the kernel 141, the middle 143, and the API 145 may be referred to as an operating system (OS).

The kernel 141, for example, may control or manage system resources (e.g., the bus 110, the processor 120, or the memory 130) used to execute operations or functions implemented in the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function, for example, as an intermediary for making the API 145 or the application programs 147 communicate with the kernel 141 to exchange data. Furthermore, in regard to task requests received from the application programs 147, the middleware 143 may perform a control (e.g., scheduling or load balancing) for the task requests, for example, using a method of assigning a priority to use the system resources (e.g., the bus 110, the processor 120, or the memory 130) of the electronic device 101 to at least one of the application programs 147.

The API 145 is, for example, an interface by which the applications 147 control functions provided from the kernel 141 or the middleware 143, and may include, for example, at least one interface or function (e.g., instruction) for file control, window control, image processing, or text control.

The input/output interface 150 may function, for example, as an interface that may transfer instructions or data input from a user or another external device, to the other element (s) of the electronic device 101. In addition, the input/output interface 150 may output instructions or data received from the other element(s) of the electronic device 101, to the user or another external device.

The display 160 may include, for example, a liquid crystal display (LCD), a light emitting diode (LED) display, an organic light emitting diode (OLED) display, a micro electro mechanical system (MEMS) display, or an electronic paper display. The display 160, for example, may display various types of content (e.g., text, images, videos, icons, or symbols) to the user. The display 160 may include a touch screen and receive, for example, a touch input, a gesture input, a proximity input, or a hovering input using an electronic pen or a user's body part.

The communication interface 170, for example, may configure communication between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may use, for example, at least one of LTE, LTE-A, CDMA, WCDMA, UMTS, WiBro, and GSM as a cellular communication protocol. The wired communication may include, for example, at least one of a universal serial bus (USB), a high definition multimedia interface (HDMI), recommended standard 232 (RS-232), and a plain old telephone service (POTS). The network 162 may include a telecommunication network, for example, at least one of a computer network (e.g., a LAN or a WAN), the Internet, and a telephone network.

Each of the first and second external electronic devices 102 and 104 may be of the same type as or a different type from the electronic device 101. According to an embodiment, the server 106 may include a group of one or more servers. According to various embodiments, all or some of the operations executed in the electronic device 101 may be carried out by another or other electronic devices (e.g., the first external electronic device 102 or the second external electronic device 104 or the server 106). According to an embodiment, when the electronic device 101 has to perform some functions or services automatically or in response to a request, the electronic device 101 may make a request for performing at least some functions relating to the functions or services to another device (e.g., the first external electronic device 102 or the second external electronic device 104 or the server 106) instead of performing the functions or services by itself. The other electronic device (e.g., the first external electronic device 102 or the second external electronic device 104 or the server 106) may carry out the requested functions or the additional functions and transfer the result obtained by carrying out the functions to the electronic device 101. The electronic device 101 may provide the requested functions or services by processing the received result on the electronic device 101 or remotely. To achieve this, for example, cloud computing, distributed computing, or client-server computing technology may be used.

According to an embodiment, the data providing module 180 may perform at least one of the operations (or functions) which are implemented in the electronic device 101, thereby supporting the driving of the electronic device 101. For example, the server 106 may include a data providing server module 108 that may support the data providing module 180 implemented in the electronic device 101. For example, the data providing server module 108 may include at least one element of the data providing module 180 to perform (e.g., on behalf of the data providing module 180) at least one of the operations performed by the data providing module 180.

The data providing module 180 may process at least some of the information obtained from the other elements (e.g., at least one of the processor 120, the memory 130, the input/output interface 150, and the communication interface 170) and utilize the information in various manners. For example, the data providing module 180 may control at least some functions of the electronic device 101 using the processor 120 or independently of the processor 120 so that the electronic device 101 interworks with another electronic device (e.g., the first external electronic device 102 or the second external electronic device 104 or the server 106). The data providing module 180 may be integrated into the processor 120 or the communication interface 170. According to an embodiment, at least one element of the data providing module 180 may be included in the server 106 (e.g., the data providing server module 108) and receive, from the server 106, the support of at least one operation implemented in the data providing module 180. Additional information on the data providing module 180 will be provided through FIG. 3 to be described below.

Figure 2:
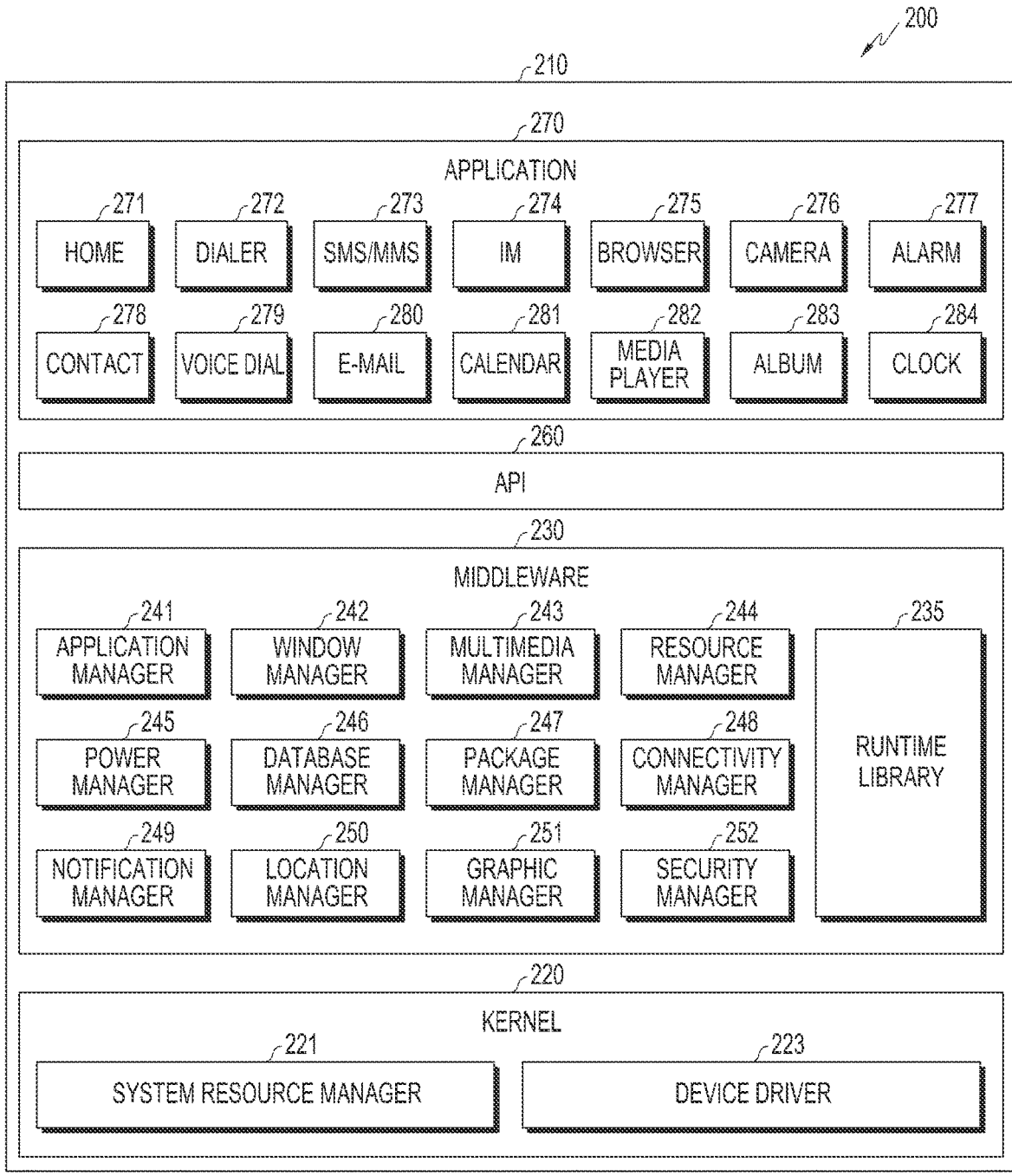
FIG. 2 is a block diagram of a program module according to an embodiment of the present disclosure.

FIG. 2 is a block diagram of a program module according to an embodiment of the present disclosure.

Referring to FIG. 2, a block diagram 200 of a program module 210 (e.g., the program 140) may include an OS for controlling resources relating to an electronic device (e.g., the electronic device 101) and/or various applications (e.g., the application programs 147) driven in the operating system. The OS may be, for example, Android, iOS, Windows, Symbian, Tizen, Bada, and/or the like.

The programming module 210 may include a kernel 220, middleware 230, an API 260, and/or an applications 270. At least some of the program module 210 may be preloaded on the electronic device or downloaded from a server (e.g., the server 106).

The kernel 220 (e.g., the kernel 141 of FIG. 1) may include, for example, a system resource manager 221 or a device driver 223. The system resource manager 221 may control, allocate, or collect the system resources. According to an embodiment, the system resource manager 221 may include a process manager, a memory manager, or a file system manager. The device driver 223 may include, for example, a display driver, a camera driver, a Bluetooth driver, a shared-memory driver, a USB driver, a keypad driver, a Wi-Fi driver, an audio driver, or an inter-process communication (IPC) driver.

The middleware 230 may provide a function commonly required by the applications 270, or may provide various functions to the applications 270 through the API 260 so that the applications 270 may efficiently use limited system resources of the electronic device 101. According to an embodiment, the middleware 230 (e.g., the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The run time library 235 may include, for example, a library module that a compiler uses in order to add new functions through a programming language while the applications 270 are executed. The run time library 235 may perform input/output management, memory management, or a function for an arithmetic function.

The application manager 241 may manage, for example, a life cycle of at least one of the applications 270. The window manager 242 may manage GUI resources used on the screen. The multimedia manager 243 may identify a format required for reproducing various media files and encode or decode a media file using a codec appropriate for the corresponding format. The resource manager 244 may manage resources of at least one of the applications 270, such as a source code, a memory, a storage space, or the like.

The power manager 245, for example, may operate together with a basic input/output system (BIOS) to manage a battery or power, and may provide power information required for the operation of the electronic device 101. The database manager 246 may generate, search, or modify a database to be used by at least one of the applications 270. The package manager 247 may manage the installation or the update of applications distributed in the form of a package file.

The connectivity manager 248 may manage, for example, a wireless connection, such as Wi-Fi or Bluetooth. The notification manager 249 may display or notify of an event, such as a received message, an appointment, and a proximity notification, to a user without disturbance. The location manager 250 may manage location information of the electronic device 101. The graphic manager 251 may manage graphic effects to be provided to a user and a user interface relating to the graphic effects. The security manager 252 may provide all security functions required for system security or user authentication. According to an embodiment, in cases where the electronic device 101 has a telephone function, the middleware 230 may further include a telephony manager for managing a voice or video call function of the electronic device 101.

The middleware 230 may include a middleware module for forming a combination of various functions of the aforementioned elements. The middleware 230 may provide specialized modules according to types of operating systems in order to provide differentiated functions. In addition, the middleware 230 may dynamically omit some of the existing elements, or may additionally include new elements.

The API 260 (e.g., the API 145) is, for example, a set of API programming functions, which may include different configurations according to operating systems. For example, in the case of Android or iOS, one API set may be provided to each platform, and in the case of Tizen, two or more API sets may be provided to each platform.

The applications 270 (e.g., the application programs 147) may include, for example, one or more applications that may provide functions, such as a home 271, a dialer 272, an SMS/MMS 273, an instant message (IM) 274, a browser 275, a camera 276, an alarm 277, contacts 278, a voice dialer 279, an e-mail 280, a calendar 281, a media player 282, an album 283, a clock 284, health care (e.g., to measure exercise quantity or blood sugar), or environment information (e.g., atmospheric pressure, humidity, or temperature information).

According to an embodiment, the applications 270 may include an application (hereinafter, referred to as an "information exchange application" for convenience of description) for supporting information exchange between the electronic device (e.g., the electronic device 101) and an external electronic device (e.g., the first external electronic device 102 or the second electronic device 104). The information exchange application may include, for example, a notification relay application for transferring specific information to the external electronic device, or a device management application for managing the external electronic device.

For example, the notification relay application may include a function of transferring, to the external electronic device (e.g., the first external electronic device 102 or the second external electronic device 104), notification information generated from the other applications of the electronic device 101 (e.g., the SMS/MMS application, the e-mail application, the health care application, or the environmental information application). Furthermore, the notification relay application, for example, may receive notification information from an external electronic device and provide the received notification information to a user. The device management application may manage (e.g., install, delete, or update), for example, at least one function of the external electronic device (e.g., the first external electronic device 102 or the second external electronic device 104) communicating with the electronic device (e.g., turning on/off the external electronic device itself (or some elements thereof) or adjusting the brightness (or resolution) of a display), applications executed in the external electronic device, or services provided from the external electronic device (e.g., a telephone call service or a message service).

According to an embodiment, the applications 270 may include an application (e.g., a health care application) designated according to the attribute of the external electronic device (e.g., the first external electronic device 102 or the second external electronic device 104) (e.g., as an attribute, the type of which is a mobile medical device). According to an embodiment, the applications 270 may include an application received from the external electronic device (e.g., the server 106, the first external electronic device 102 or the second external electronic device 104). According to an embodiment, the applications 270 may include a preloaded application or a third party application that may be downloaded from a server. The names of the elements of the program module 210, according to the illustrated embodiment, may vary depending on the type of operating system.

According to various embodiments, at least a part of the programming module 210 may be implemented in software, firmware, hardware, or a combination of two or more thereof. At least a part of the programming module 210 may be implemented (e.g., executed), for example, by a processor (e.g., the AP 210). At least a part of the programming module 210 may include, for example, modules, programs, routines, sets of instructions, or processes, for performing one or more functions.

Figures 3A, 3B:
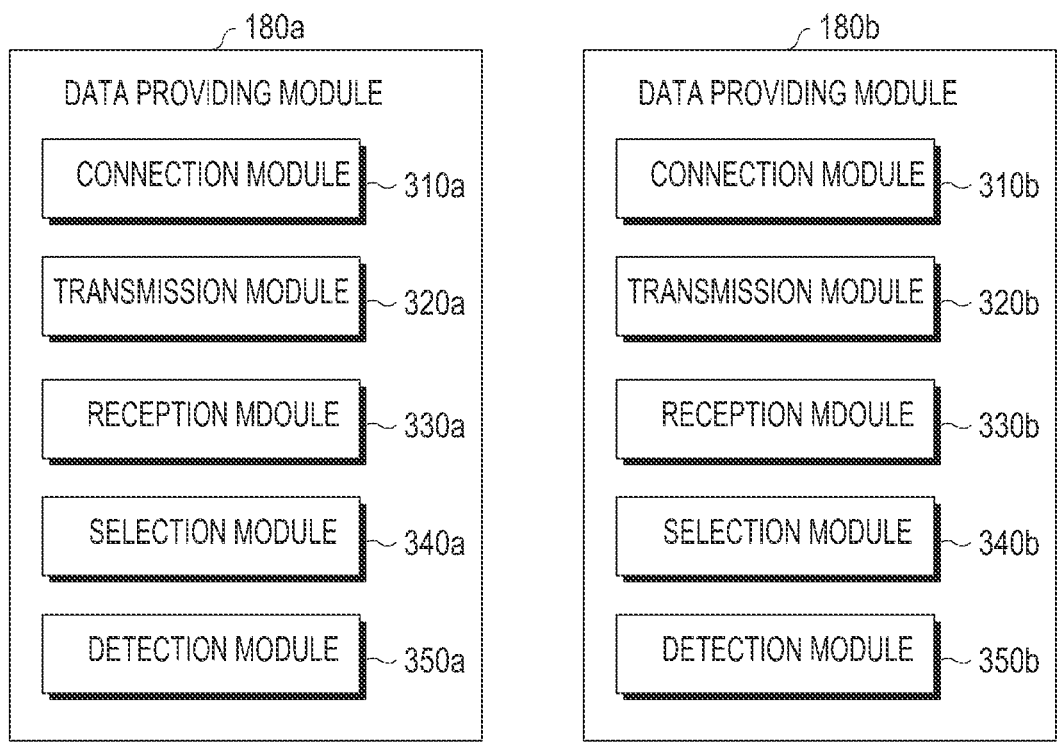
FIGS. 3A and 3B are block diagrams of first and second data providing modules according to various embodiments of the present disclosure.

FIGS. 3A and 3B are block diagrams of first and second data providing modules and of an electronic device, according to various embodiments of the present disclosure.

Referring to FIGS. 3A and 3B, the electronic device 101 may include at least one of first and second data providing modules 180a and 180b. Hereinafter, for example, it will be exemplified that a first electronic device includes the first data providing module 180a and a second electronic device includes the second data providing module 180b. In the following description, an electronic device for providing specific data may be referred to as a host device or a source device, and an electronic device for receiving the specific data may be referred to as a client device or a sink device.

Referring to FIG. 3A, the first data providing module 180a may include a connection module 310a, a transmission module 320a, a reception module 330a, a selection module 340a, and a detection module 350a, or may include at least some or all of them. The first data providing module 180a may be provided to be separate from a processor (e.g., the processor 120), or the entirety or a part of the first data providing module 180a may be integrated into the processor.

The connection module 310a, according to the various embodiments of the present disclosure, may connect the first electronic device to a plurality of electronic devices. For example, the connection module 310a may connect the first electronic device to a neighboring device through a communication interface (e.g., the communication interface 170) according to a user input or a request of the neighboring device or setting of the first electronic device.

Instead of the first electronic device, the transmission module 320a, according to the various embodiments of the present disclosure, may transmit information on data that may be provided to the plurality of electronic devices by the first electronic device to the second electronic device, from among the plurality of electronic devices, which is selected as a host device for transmitting the data to at least one electronic device (hereinafter, may be referred to as at least one client device) from among the plurality of electronic devices. For example, the transmission module 320a may transmit the information on the data stored in a memory (e.g., the memory 130) of the first electronic device to the second electronic device through the communication interface. The information on the data may include a list of the data which may be provided to the plurality of electronic devices by the first electronic device. For example, the information on the data may include at least one of identification information of at least one piece of data, identification information of an application for processing the at least one piece of data, identification information of a service associated with the at least one piece of data, and/or the like.

The transmission module 320a may transmit the data to the second electronic device.

In an embodiment, the transmission module 320a may also transmit the information on the data to each of the plurality of electronic devices.

In an embodiment, the transmission module 320a may transmit, to the second electronic device, the identification information of the at least one electronic device to which the data will be transmitted.

In an embodiment, the transmission module 320a may transmit, to the second electronic device, a list of the at least one electronic device to which the data will be transmitted.

In an embodiment, the transmission module 320a may transmit, to the second electronic device, the identification information of the at least one electronic device to which the data will be transmitted and information for a communication connection with the at least one electronic device.

In an embodiment, the transmission module 320a may transmit a message for requesting the selection of a host device to each of the plurality of electronic devices or to the second electronic device. In an embodiment, the selection of the host device may be based on the hosting capabilities of the plurality of electronic devices.

In an embodiment, the message may include information on at least one attribute value for calculating each of the hosting capabilities. For example, the at least one attribute value may include at least one of the amount or level of a residual battery, the amount or level of a residual memory space, the maximum number of electronic devices that may be hosted, a communication speed, and a data processing rate.

The reception module 330a, according to the various embodiments of the present disclosure, may receive, from each of the plurality of electronic devices, a request for subscribing to (or providing) data or a registration request of the corresponding electronic device.

In an embodiment, the reception module 330a may receive the identification information of the host device from one of the plurality of electronic devices. For example, the reception module 330a may receive the identification information of the host device from the second electronic device or the third electronic device from among the plurality of electronic devices.

In an embodiment, the transmission module 320a may transmit a response to the subscription request or the registration request to the corresponding electronic device.

In an embodiment, the reception module 330a may receive, from the second electronic device, a message for requesting a list of data which may be provided to the plurality of electronic devices by the first electronic device. In an embodiment, the transmission module 320a may transmit the list of the data to the second electronic device in response to the request.

In an embodiment, the reception module 330a may receive a transmission request for the data from the second electronic device. The transmission module 320a may transmit the data to the second electronic device in response to the request.

The selection module 340a, according to the various embodiments of the present disclosure, may select one of the plurality of electronic devices as a host device on the basis of the hosting capabilities of the plurality of electronic devices.

In an embodiment, the transmission module 320a may transmit a message for notifying of the selection to the selected host device.

In an embodiment, the transmission module 320a may transmit the identification information of the host device to each of the plurality of electronic devices.

In an embodiment, the reception module 330a may receive, from each of the plurality of electronic devices, at least one attribute value of the corresponding electronic device. The selection module 340a may calculate the hosting capability of the corresponding electronic device on the basis of the at least one attribute value of the corresponding electronic device, and the selection module 340a may select one of the plurality of electronic devices as a host device on the basis of the comparison between the hosting capabilities of the plurality of electronic devices.

The detection module 350a, according to the various embodiments of the present disclosure, may detect the occurrence of an event associated with the data. The event may periodically or aperiodically occur. For example, the first electronic device may periodically or successively acquire a user's biometric data (e.g., a pulse, a heart rate, oxygen saturation, a blood flow rate, and/or the like) using a sensor module, or may acquire biometric data from an external sensor through a communication interface (e.g., the communication interface 170). For example, in the acquisition of periodic biometric data, an event representing the acquisition of new biometric data may periodically occur, and in the acquisition of aperiodic biometric data, the event representing the acquisition of new biometric data may aperiodically occur. For example, the first electronic device may compare new biometric data with previous biometric data, and when a difference between the new biometric data and the previous biometric data is a preset threshold value or more, the first electronic device may determine that the event has occurred. For example, the new biometric data and the previous biometric data may be stored in a memory of the first electronic device. For example, the first electronic device may replace/update the previous biometric data with/ to the new biometric data. For example, the first electronic device may detect the occurrence of the event according to the expiration of a timer irrespective of the acquisition of the new biometric data.

The first electronic device may transmit the data to the second electronic device according to the occurrence of the event.

In an embodiment, the transmission module 320a may transmit, to the second electronic device, a first list of the at least one electronic device to which the data will be transmitted. The reception module 330a may receive, from the third electronic device, a request for data subscription or a registration request of the corresponding electronic device. The transmission module 320a may transmit a second list of the third electronic device and the at least one electronic device to the second electronic device. For example, in cases where an event requiring the change of a list, such as modification/addition/registration release of a host device, modification/addition/registration release of a client device, or the like, occurs, the first electronic device may update a list of client devices that the second electronic device will host.

In an embodiment, the first electronic device may calculate the hosting capability thereof on the basis of at least one attribute value thereof and compare the hosting capability with a threshold value. When the hosting capability is the threshold value or less, the first electronic device may start an operation of transmitting information on the data to the second electronic device.

In an embodiment, the first electronic device, after transmitting the information on the data to the second electronic device, may automatically release the connection with the at least one electronic device.

In an embodiment, the first electronic device may also select two or more electronic devices as host devices from among the plurality of electronic devices.

In an embodiment, the first electronic device may allow the second electronic device to transmit the data to some client devices from among the plurality of electronic devices, and may directly transmit the data to the remaining client devices from among the plurality of electronic devices.

In an embodiment, the first electronic device may select two or more electronic devices as host devices from among the plurality of electronic devices, allow the second electronic device from among the plurality of electronic devices to transmit first data from among a plurality of pieces of data that may be provided by the first electronic device to at least one client device, and allow the third electronic device from among the plurality of electronic devices to transmit second data from among the plurality of pieces of data to at least one client device.

In an embodiment, the first electronic device may select two or more electronic devices as host devices from among the plurality of electronic devices, allow the second electronic device to transmit the data to some client devices including the third electronic device from among the plurality of electronic devices, and allow the third electronic device to transmit the data to the remaining client devices from among the plurality of electronic devices.

In an embodiment, the first electronic device may select the second electronic device as a host device from among the plurality of electronic devices, the second electronic device may select the third electronic device as a host device from among the plurality of electronic devices and transmit the data to some client devices including the third electronic device from among the plurality of electronic devices, and the third electronic device may transmit the data to the remaining client devices from among the plurality of electronic devices.

Referring to FIG. 3B, the second data providing module 180a may include a connection module 310b, a transmission module 320b, a reception module 330b, a selection module 340b, and a detection module 350b, or may include at some of them. The second data providing module 180b may be provided to be separate from a processor (e.g., the processor 120), or the entirety or a part of the second data providing module 180a may be integrated into the processor.

The connection module 310b, according to the various embodiments of the present disclosure, may be connected to the first electronic device. For example, the connection module 310b may connect the second electronic device to the first electronic device through a communication interface (e.g., the communication interface 170) according to a user input or a request of a neighboring device or setting of the second electronic device.

The reception module 330b, according to the various embodiments of the present disclosure, may receive, from the first electronic device, information on data that may be provided to a plurality of electronic devices by the first electronic device. The reception module 330b may receive the data from the first electronic device. For example, the reception module 330b may receive the information on the data and the data through the communication interface from the first electronic device.

The information on the data may include a list of the data which may be provided to the plurality of electronic devices by the first electronic device. For example, the information on the data may include at least one of identification information of at least one piece of data, identification information of an application for processing the at least one piece of data, identification information of a service associated with the at least one piece of data, and/or the like.

Instead of the first electronic device, the transmission module 320b, according to the various embodiments of the present disclosure, may transmit the data to at least one electronic device (hereinafter, may be referred to as at least one client device) among a plurality of electronic devices.

In an embodiment, the reception module 330b may receive, from the first electronic device, the identification information of the at least one electronic device to which the data will be transmitted.

In an embodiment, the reception module 330b may receive, from the first electronic device, a list of the at least one electronic device to which the data will be transmitted.

In an embodiment, the reception module 330b may receive, from the first electronic device, the identification information of the at least one electronic device to which the data will be transmitted and information for a communication connection with the at least one electronic device.

In an embodiment, the reception module 330b may receive, from the first electronic device, a message for making a request for selecting one of the plurality of electronic devices as a host device. In an embodiment, the selection of the host device may be based on the hosting capabilities of the plurality of electronic devices.

In an embodiment, the message may include information on at least one attribute value for calculating each of the hosting capabilities. For example, the at least one attribute value may include at least one of the amount or level of a residual battery, the amount or level of a residual memory space, the maximum number of electronic devices that may be hosted, a communication speed, and a data processing rate.

In an embodiment, the transmission module 320b may transmit a request for subscribing to data or a registration request of the second electronic device to the first electronic device. The reception module 330b may receive a response to the subscription request or the registration request from the first electronic device.

In an embodiment, the reception module 330b may receive the identification information of the host device from the third electronic device or the first electronic device from among the plurality of electronic devices.

In an embodiment, the transmission module 320b may transmit, to the first electronic device, a message for requesting the list of the data which may be provided to the plurality of electronic devices by the first electronic device. The reception module 330b may receive a response to the request including the list of the data from the first electronic device.

In an embodiment, the transmission module 320b may transmit the request of the data to the first electronic device. The reception module 330b may receive a response to the request including the data from the first electronic device.

The selection module 340b, according to the various embodiments of the present disclosure, may select one of the plurality of electronic devices as a host device on the basis of the hosting capabilities of the plurality of electronic devices.

In an embodiment, the transmission module 320b may transmit a message for notifying of the selection to the selected host device and/or the first electronic device.

In an embodiment, the transmission module 320b may transmit the identification information of the host device to each of the plurality of electronic devices and/or the first electronic device.

In an embodiment, the reception module 330b may receive, from each of the plurality of electronic devices, at least one attribute value of the corresponding electronic device. The selection module 340b may calculate the hosting capability of the corresponding electronic device on the basis of the at least one attribute value of the corresponding electronic device, and the selection module 340b may select one of the plurality of electronic devices as a host device on the basis of the comparison between the hosting capabilities of the plurality of electronic devices.

The detection module 350b, according to the various embodiments of the present disclosure, may detect the occurrence of an event associated with the data. The event may periodically or aperiodically occur. For example, the second electronic device may periodically or aperiodically acquire a user's biometric data (e.g., a pulse, a heart rate, oxygen saturation, a blood flow rate, and/or the like) from the first electronic device through a communication interface (e.g., the communication interface 170). For example, the second electronic device may compare the biometric data received from the first electronic device with previous biometric data, and when a difference between the new biometric data and the previous biometric data is a preset threshold value or more, the second electronic device may determine that the event has occurred. For example, the new biometric data and the previous biometric data may be stored in a memory of the second electronic device. For example, the second electronic device may replace/update the previous biometric data with/to the new biometric data. For example, the second electronic device may detect the occurrence of the event according to the expiration of a timer irrespective of the acquisition of the new biometric data.

The second electronic device may transmit the data to the at least one electronic device according to the occurrence of the event.

In an embodiment, the reception module 330b may receive, from the first electronic device, a first list of the at least one electronic device to which the data will be transmitted. The reception module 330b may receive a second list of the third electronic device and the at least one electronic device from the first electronic device. For example, the second electronic device may replace/update the first list with/to the second list.

In an embodiment, the second electronic device may calculate the hosting capability thereof on the basis of at least one attribute value thereof and compare the hosting capability with a threshold value. When the hosting capability is the threshold value or less, the second electronic device may transmit information on the data to the third electronic device among at least one electronic device to which the data will be transmitted.

In an embodiment, the second electronic device, after transmitting the information on the data to the third electronic device, may automatically release the connection with the first electronic device and receive the data from the third electronic device.

In an embodiment, the second electronic device may allow the third electronic device to transmit the data to some client devices from among the at least one electronic device, and may directly transmit the data to the remaining client devices from among the at least one electronic device.

Figure 4:
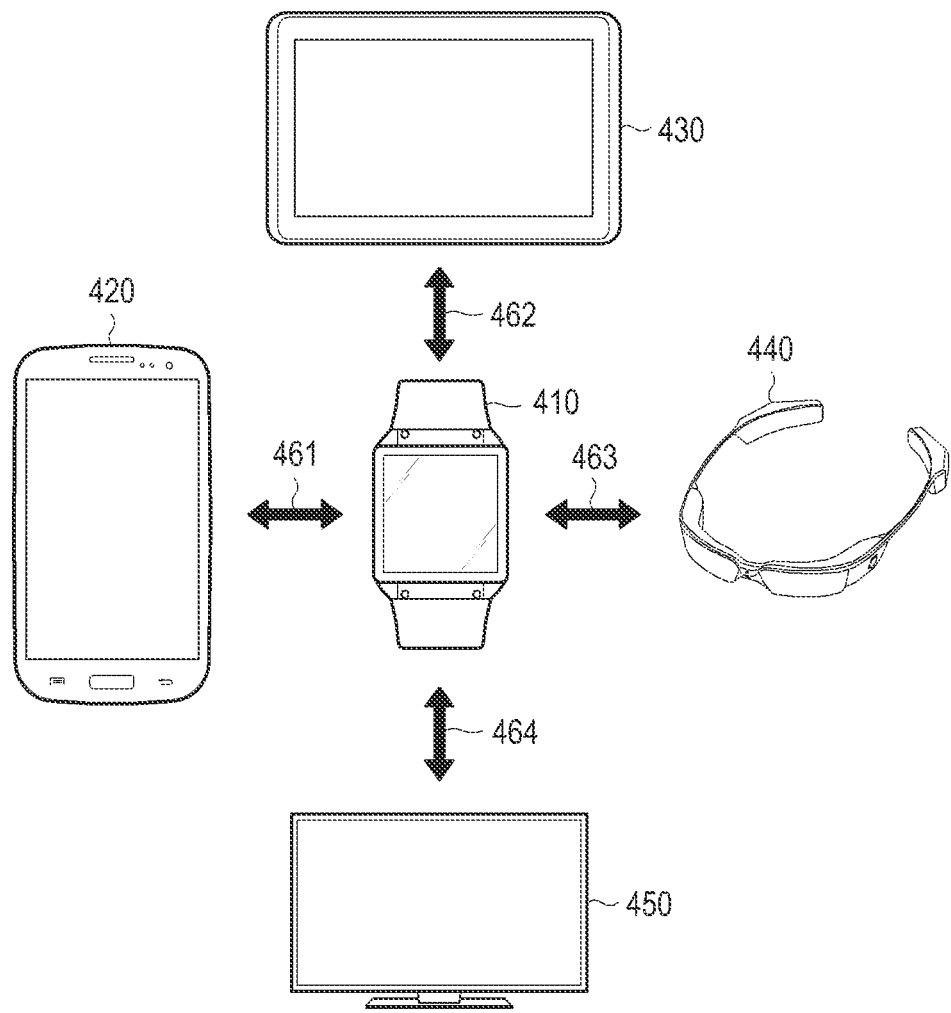
FIG. 4 illustrates a network environment according to an embodiment of the present disclosure.

FIG. 4 illustrates a network environment according to an embodiment of the present disclosure.

Referring to FIG. 4, a network environment 400 may include a first electronic device 410 (e.g., a watch), a second electronic device 420 (e.g., the electronic device 101), a third electronic device 430 (e.g., a tablet PC), a fourth electronic device 440 (e.g., glasses), and a fifth electronic device 450 (e.g., a television). The first to fifth electronic devices 410, 420, 430, 440, and 450 may have a configuration the same as or similar to that of the electronic device 101 illustrated in FIG. 1.

For example, each of the first to fifth electronic devices 410, 420, 430, 440, and 450 may have a first communication module for supporting a first communication type (e.g., Wi-Fi communication) and a second communication module for supporting a second communication type (e.g., Bluetooth communication).

For example, the first electronic device 410 may establish first to fourth communication connections 461, 462, 463, and 464 with the second to fifth electronic devices 420, 430, 440, and 450, respectively, through at least one communication module.

In the following various embodiments, requests, responses, data, information, or the like transmitted between the electronic devices may be transmitted while being included in messages of a preset format.

Figure 5:
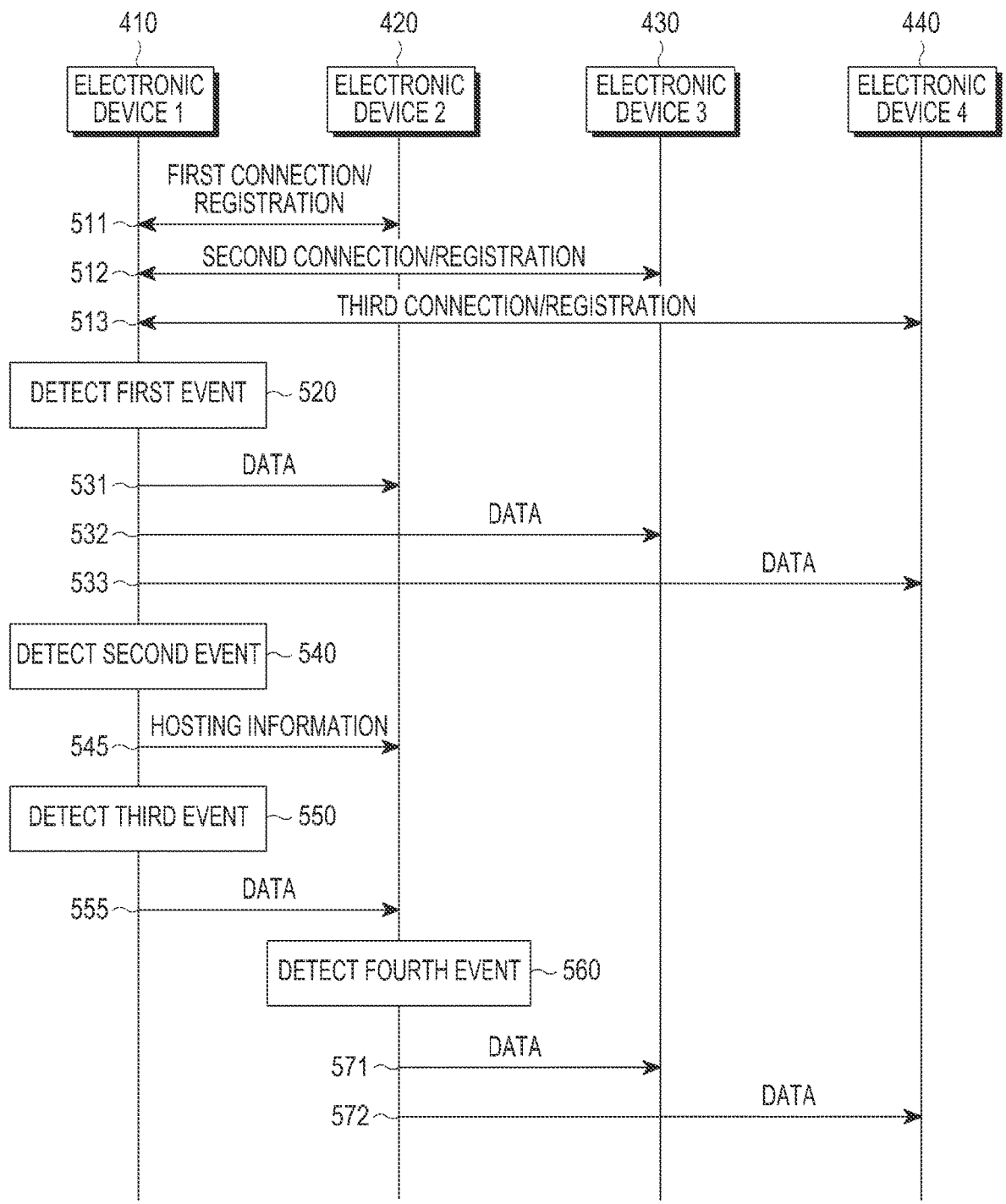
FIGS. 5, 6, 7, 8, 9, 10, 11, 12 and 13 are flow diagrams for explaining data providing methods according to various embodiments of the present disclosure.

FIG. 5 is a signal flow diagram for explaining a data providing method according to an embodiment of the present disclosure.

Referring to FIG. 5, in operation 511, the first electronic device 410 may establish a first communication connection (e.g., pairing, host/client connection, and/or the like) with the second electronic device 420. For example, the first electronic device 410 may include a plurality of communication modules for supporting various communication types and establish the first communication connection with the second electronic device 420 through a first communication module of a first communication type (e.g., Wi-Fi) from among the plurality of communication modules.

In an embodiment, the first electronic device 410 may receive a request for subscribing to (or providing) data (or a request for a data providing service) or a registration request of the second electronic device 420 for data subscription from the second electronic device 420. The first electronic device 410 may transmit a response to the subscription or registration request (e.g., permission/approval for the subscription/registration or rejection of the subscription/registration) to the second electronic device 420. The data may be real-time data, sensor data (e.g., temperature data, humidity data, biometric data, and/or the like), contextual data (e.g., event information, a user's presence information (online, offline, non-occupancy, and/or the like), location information, and/or the like), video data, audio data, a document, or the like. For example, the data may be periodically or aperiodically updated (or modified).

In operation 512, the first electronic device 410 may establish a second communication connection of the first communication type with the third electronic device 430. In an embodiment, the first electronic device 410 may receive a data subscription request or a registration request of the third electronic device 430 for data subscription from the third electronic device 430. The first electronic device 410 may transmit a response to the subscription or registration request to the third electronic device 430.

In operation 513, the first electronic device 410 may establish a third communication connection of the first communication type with the fourth electronic device 440. In an embodiment, the first electronic device 410 may receive a data subscription request or a registration request of the fourth electronic device 440 for data subscription from the fourth electronic device 440. The first electronic device 410 may transmit a response to the subscription or registration request to the fourth electronic device 440.

The first electronic device 410 may discover the second to fourth electronic devices 420, 430, and 440 for supporting the first communication type which are located in the coverage area of the first communication module. The first electronic device 410 may establish the first to third communication connections with the second to fourth electronic devices 420, 430, and 440, respectively, according to user inputs or environment settings of the first electronic device 410. For example, the first electronic device 410 may display a list of the second to fourth electronic devices 420, 430, and 440 on a display thereof (e.g., the display 160), detect a user's selection of the second to fourth electronic devices 420, 430, and 440, and establish communication connections with the second to fourth electronic devices 420, 430, and 440. Each communication connection may include at least one of a session connection using a session ID, a communication channel connection using a communication channel ID, and/or the like. In the process of connecting the communication, the first electronic device 410 may perform at least one of authentication/identification of a counterpart electronic device, setup/notification and/or reception (or consultation) of a communication ID (e.g., a session ID or a communication channel ID), setup/notification and/or reception (or consultation) of a communication scheme/procedure and/or a data format, allocation/notification and/or reception (or consultation) of network resources, notification and/or reception (or exchange) of data/service resource information (i.e., a service or data that may be provided), notification or reception (or exchange) of capability information (e.g., the amount or level of a residual battery, the amount or level of a residual memory space, the maximum number of electronic devices that may be hosted, a communication speed, or a data processing rate), synchronization, and/or the like. After the communication connections, the first electronic device 410 may perform data (or content) communication with the counterpart electronic devices according to the communication schemes/procedures/formats which are set in the communication connection processes, and during the data communication, repetitive communication connection operations may not be necessary.

In operation 520, the first electronic device 410 may detect the first event(s) requiring the transmission of the subscription requested data.

The first event may be generated by the acquisition/modification/update of the subscription requested data, the expiration of a timer, data request of each of one or more of the second to fourth electronic devices 420, 430, and 440, and/or the like.

For example, the first electronic device 410 may periodically or successively acquire a user's biometric data (or information) (e.g., a pulse, a heart rate, oxygen saturation, a blood flow rate, and/or the like) using a sensor module, or may acquire biometric data from an external sensor through a communication interface (e.g., the communication interface 170). For example, in the acquisition of periodic biometric data, the first event representing the acquisition of new biometric data may be periodically generated, and in the acquisition of aperiodic biometric data, the first event representing the acquisition of new biometric data may be aperiodically generated. For example, the first electronic device 410 may compare new biometric data with previous biometric data, and when a difference between the new biometric data and the previous biometric data is a preset threshold value or more, the first electronic device 410 may determine that the first event has been generated. For example, the new biometric data and the previous biometric data may be stored in a memory (e.g., the memory 130) of the first electronic device 410. For example, the first electronic device 410 may replace/update the previous biometric data with/to the new biometric data. For example, the first electronic device 410 may detect the generation of the first event according to the expiration of a timer irrespective of the acquisition of the new biometric data.

In operation 531, the first electronic device 410 may transmit the subscription requested data to the second electronic device 420.

In operation 532, the first electronic device 410 may transmit the subscription requested data to the third electronic device 430.

In operation 533, the first electronic device 410 may transmit the subscription requested data to the fourth electronic device 440.

In operation 540, the first electronic device 410 may detect the second event requiring the transmission of hosting information on the subscription requested data or a service. The hosting information may include at least one of identification information (or data resource information) for the subscription requested data or a service (e.g., identification information of the data, identification information of an application that processes the data, or identification information of a service associated with the data), identification information of a host device and/or a client device for a data providing service (e.g., an account, a device name, a unique ID, a network address, an MAC address, a SIM card ID, a telephone number, a serial number, a Bluetooth address, a Wi-Fi address, a ZigBee address, an NFC address, device type information (e.g., device type/sort, application/function/service, and/or the like), or the like), communication connection information (e.g., an ID, a password, a phone number, a communication type/scheme/procedure (or a communication connection type/scheme/procedure), communication module identification information, data format information, information on communication resources (e.g., network resources or service resources), synchronization information, a communication device name, a network address, an IP address, an MAC address, a Bluetooth address, a Wi-Fi address, a ZigBee address, an NFC address, or the like), and/or information on at least one attribute value for calculating a hosting capability (e.g., the amount or level of a residual battery, the amount or level of a residual memory space, the maximum number of electronic devices that may be hosted, a communication speed, a data processing rate, or the like). For example, the data resource information may be provided in the shape of a list in which identification information for a plurality of pieces of data is arranged. For example, the identification information of the client device may be provided in the shape of a list in which identification information for a plurality of electronic devices is arranged.

The second event may be generated by the selection of a host device from among the second to fourth electronic devices 420, 430, and 440, the reception of information on the selection of the host device, the transmission of a message to request the selection, communication connections of one or more of the second to fourth electronic devices 420, 430, and 440, degradation in the hosting capability of the first electronic device 410, or the like. For example, the hosting capability may be calculated based on at least one of the amount or level of a residual battery, the amount or level of a residual memory space, the maximum number of electronic devices that may be hosted, a communication speed, and a data processing rate, or a combination of some or all of them. For example, the hosting capability may be calculated by (a*amount (level) of residual battery+b*amount (or level) of residual memory space+c*maximum number of electronic devices which may be hosted), where a, b, and c may be preset weight values.

In an embodiment, the first electronic device 410 may select an arbitrary electronic device, the first connected electronic device, an electronic device of a preset device type, or an electronic device with the highest hosting capability, as a host device, from among the second to fourth electronic devices 420, 430, and 440.

In an embodiment, the first electronic device 410 may transmit a message for requesting the selection of a host device to each of the second to fourth electronic devices 420, 430, and 440 or to the second electronic device 420. The message may include information on at least one attribute value for calculating each hosting capability and/or identification information of candidate electronic devices that may be selected as a host device.

In operation 545, the first electronic device 410 may transmit the hosting information to the second electronic device 420 which is selected or recognized as a host device.

In operation 550, the first electronic device 410 may detect the third event requiring the transmission of the subscription requested data. The third event may be generated by the acquisition/modification/update of the subscription requested data, the expiration of a timer, the data request of the second electronic device 420, or the like.

In operation 555, the first electronic device 410 may transmit the subscription requested data to the second electronic device 420 selected as a host device.

In operation 560, the second electronic device 420 may detect the fourth event requiring the transmission of the subscription requested data. The fourth event may be generated by at least one of the acquisition or reception of the subscription requested data from the first electronic device 410, the modification/update of the subscription requested data, the expiration of a timer, and data requests of each or one or more of the third and fourth electronic devices 430 and 440.

In operation 571, the second electronic device 420 may transmit the subscription requested data to the third electronic device 430.

In operation 572, the second electronic device 420 may transmit the subscription requested data to the fourth electronic device 440.

Figure 6:
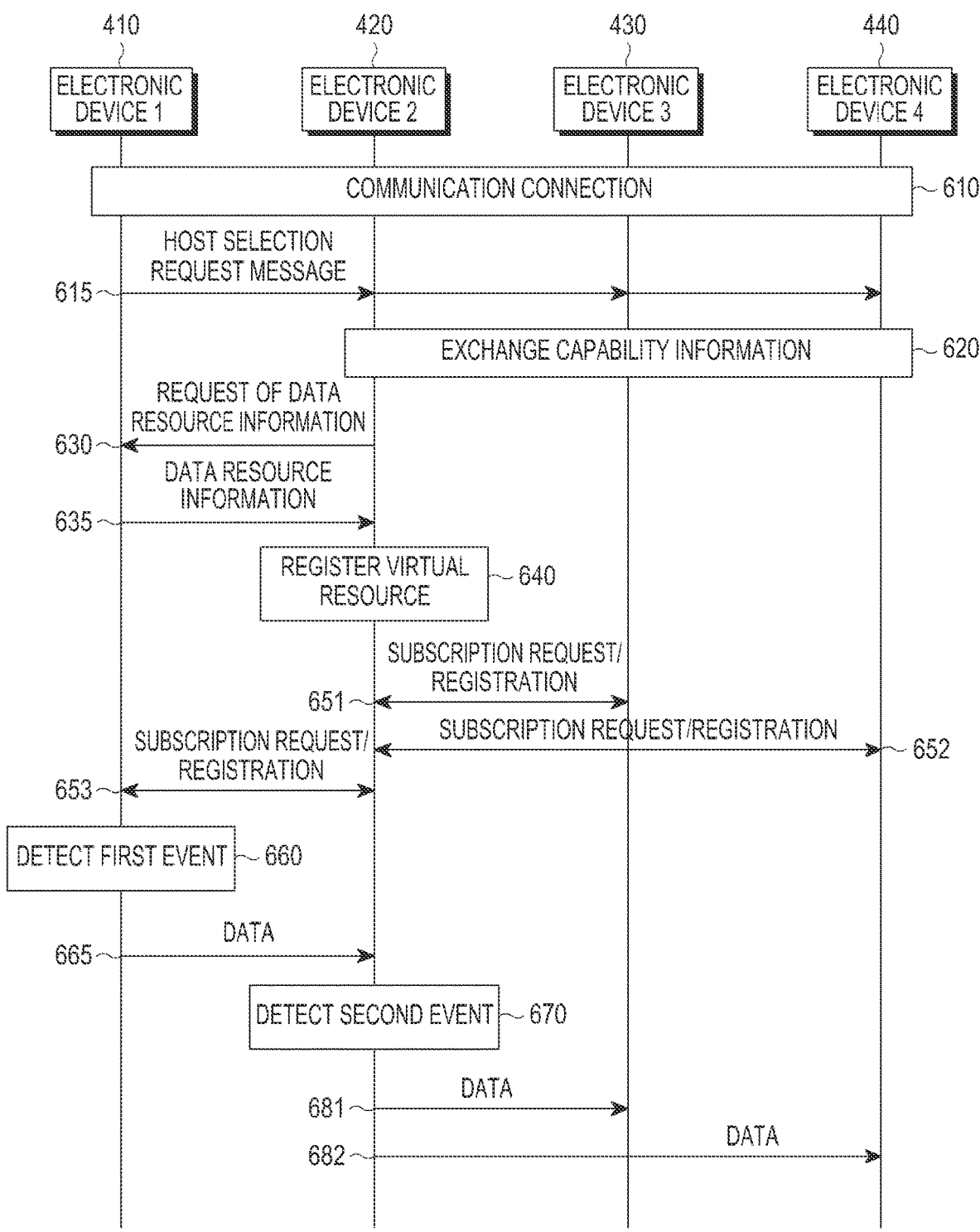

FIG. 6 is a signal flow diagram for explaining a data providing method according to various embodiments of the present disclosure.

Referring to FIG. 6, in operation 610, the first to fourth electronic devices 410, 420, 430, and 440 may establish communication connections (e.g., pairing, host/client connections, or the like) therebetween. In an embodiment, the first electronic device 410 may receive a request for subscribing to (or providing) data (or a request for a data providing service) or a registration request for data subscription from each or one or more of the second to fourth electronic devices 420, 430, and 440. The first electronic device 410 may transmit a response to the subscription or registration request (e.g., permission for the subscription/registration or rejection of the subscription/registration) to the corresponding electronic device.

In operation 615, the first electronic device 410 may transmit a message for requesting the selection of a host device to each or some of the second to fourth electronic devices 420, 430, and 440. The message may include information on at least one attribute value for calculating each hosting capability and/or identification information of candidate electronic devices that may be selected as a host device.

In operation 620, the second to fourth electronic devices 420, 430, and 440 may exchange capability information with each other. The capability information may include a hosting capability or at least one attribute value for calculating the hosting capability.

For the exchange of the capability information, the second to fourth electronic devices 420, 430, and 440 may establish communication connections with each other.

In an embodiment, each or one or more of the second to fourth electronic devices 420, 430, and 440 may receive information on at least one attribute value for calculating a hosting capability from the first electronic device 410.

In an embodiment, each of the second to fourth electronic devices 420, 430, and 440 may transmit the hosting capability thereof or at least one attribute value for calculating the hosting capability to the remaining electronic devices. For example, each of the second to fourth electronic devices 420, 430, and 440 may compare the received or calculated hosting capabilities, and each or one of them may select or recognize the electronic device having the highest hosting capability as a host device.

In an embodiment, one of the second to fourth electronic devices 420, 430, and 440 may receive a hosting capability or at least one attribute value for calculating the hosting capability from the remaining electronic devices. For example, one of the second to fourth electronic devices 420, 430, and 440 may compare the received or calculated hosting capabilities and select or recognize the electronic device having the highest hosting capability as a host device.

In operation 630, the second electronic device 420 selected or recognized as a host device may request information on data (e.g., data resource information), which may be provided to the second to fourth electronic devices 420, 430, and 440 by the first electronic device 410, from the first electronic device 410. The message including the request may include information representing that the second electronic device 420 has been selected as a host device.

In operation 635, the first electronic device 410 may transmit the data resource information to the second electronic device 420 in response to the request. For example, the data resource information may include at least one of identification information of at least one piece of data, identification information of an application for processing the at least one piece of data, identification information of a service associated with the at least one piece of data, and/or the like. For example, the data resource information may be provided in the shape of a list in which identification information for a plurality of pieces of data is arranged.

In an embodiment, the first electronic device 410 may transmit hosting information including the data resource information to the second electronic device 420 in response to the request. The hosting information may further include at least one of identification information of a host device and/or a client device for a data providing service, communication connection information, and/or the like, in addition to the data resource information.

In operation 640, the second electronic device 420 may register the data resource information as a virtual resource thereof. For example, the second electronic device 420 may store the data resource information in a memory (e.g., the memory 130) and operate as a host device that may correspond to a request of data within the data resource information from a client device.

In operation 651, the third electronic device 430 may transmit a request for subscribing to (or providing) first data (or a request for a data providing service) or a registration request of the third electronic device 430 for the subscription of the first data to the second electronic device 420. The second electronic device 420 may transmit a response to the subscription or registration request (e.g., permission for the subscription/registration or rejection of the subscription/registration) to the third electronic device 430 on the basis of the virtual resource. For example, in cases where the first data is included in the virtual resource, the second electronic device 420 may transmit a response message representing the permission of the subscription/registration to the third electronic device 430. For example, in cases where the first data is included in the virtual resource, the second electronic device 420 may transmit a response message representing the rejection of the subscription/registration to the third electronic device 430.

In operation 652, the fourth electronic device 440 may transmit a request for subscribing to (or providing) second data (or a request for a data providing service) or a registration request of the fourth electronic device 440 for the subscription of the second data to the second electronic device 420. The second electronic device 420 may transmit a response to the subscription or registration request (e.g., permission for the subscription/registration or rejection of the subscription/registration) to the fourth electronic device 440 on the basis of the virtual resource. For example, in cases where the second data is included in the virtual resource, the second electronic device 420 may transmit a response message representing the permission of the subscription/registration to the fourth electronic device 440. For example, in cases where the second data is not included in the virtual resource, the second electronic device 420 may transmit a response message representing the rejection of the subscription/registration to the fourth electronic device 440. For example, the first and second data may be the same or different from each other.

In operation 653, the second electronic device 420 may transmit a request for subscribing to (or providing) the first and second data (or a request for a data providing service) or a registration request of the second electronic device 420 for the subscription of the first and second data to the first electronic device 410. In an embodiment, the second electronic device 420 may transmit a request for subscribing to third data together with the subscription request for the first and second data to the first electronic device 410. The first electronic device 410 may transmit a response to the subscription or registration request (e.g., permission for the subscription/registration or rejection of the subscription/registration) to the second electronic device 420.

In operation 660, the first electronic device 410 may detect the first event requiring the transmission of the subscription requested data. The first event may be generated by the acquisition/modification/update of the subscription requested data, the expiration of a timer, the data request of the second electronic device 420, and/or the like.

In operation 665, the first electronic device 410 may transmit the first and second subscription requested data to the second electronic device 420 selected as a host device.

In operation 670, the second electronic device 420 may detect the second event requiring the transmission of the subscription requested data. The second event may be generated by the acquisition or reception of the subscription requested data from the first electronic device 410, the modification/update of the subscription requested data, the expiration of a timer, and data requests of each or one or more of the third and fourth electronic devices 430 and 440.

In operation 681, the second electronic device 420 may transmit the first subscription requested data to the third electronic device 430.

In operation 682, the second electronic device 420 may transmit the second subscription requested data to the fourth electronic device 440.

Figure 7:
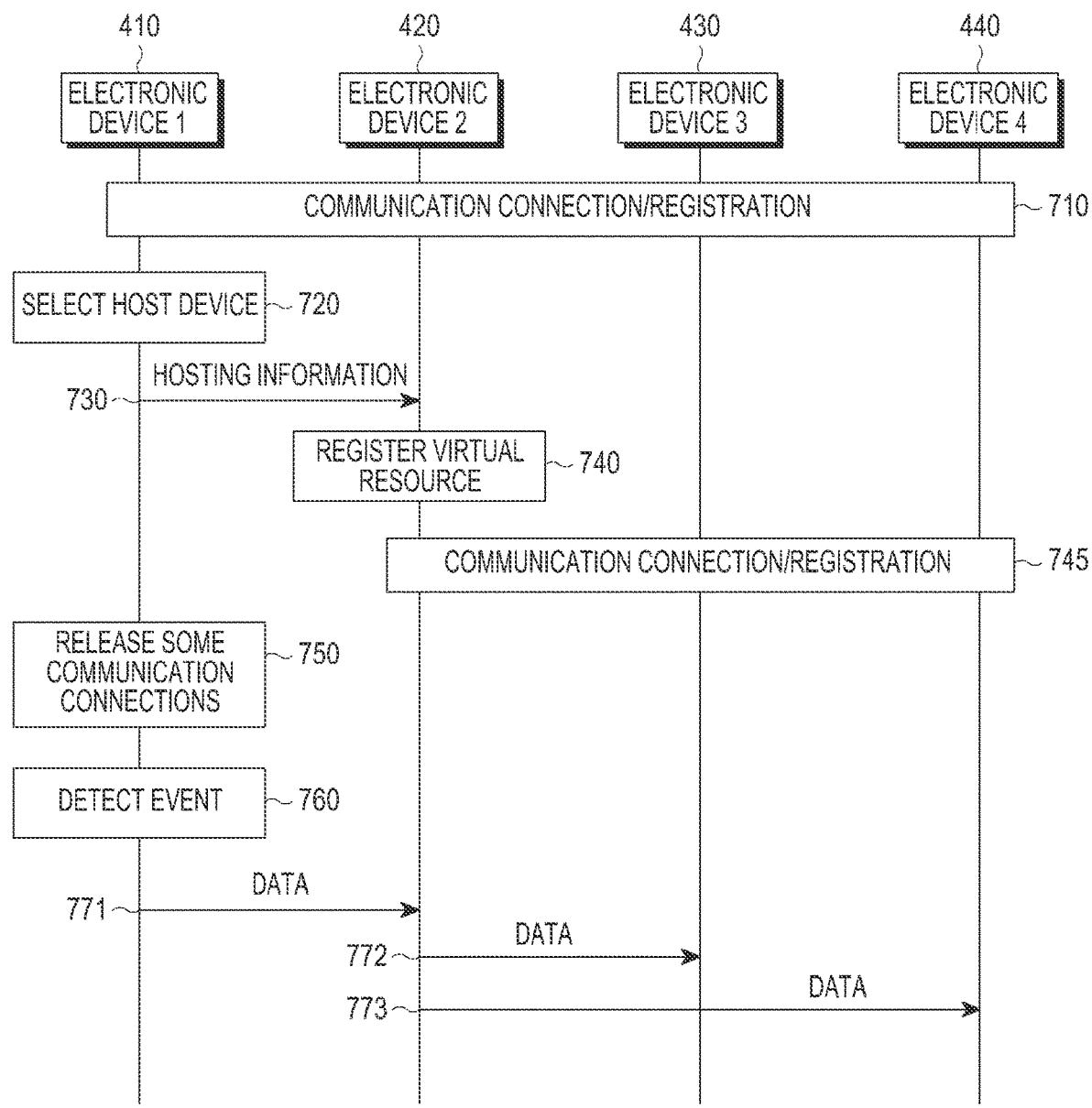

FIG. 7 is a signal flow diagram for explaining a data providing method according to an embodiment of the present disclosure.

Referring to FIG. 7, in operation 710, the first to fourth electronic devices 410, 420, 430, and 440 may establish communication connections (e.g., pairing, host/client connections, or the like) therebetween. In an embodiment, the first electronic device 410 may receive a request for subscribing to (or providing) data (or a request for a data providing service) or a registration request for data subscription from each or one or more of the second to fourth electronic devices 420, 430, and 440. The first electronic device 410 may transmit a response to the subscription or registration request (e.g., permission for the subscription/registration or rejection of the subscription/registration) to the corresponding electronic device.

In operation 720, the first electronic device 410 may select one of the second to fourth electronic devices 420, 430, and 440 as a host device. For example, the first electronic device 410 may select an arbitrary electronic device, the first connected electronic device, an electronic device of a preset device type, or an electronic device with the highest hosting capability, as a host device, from among the second to fourth electronic devices 420, 430, and 440.

In an embodiment, the first electronic device 410 may receive a hosting capability or at least one attribute value for calculating the hosting capability from each of the second to fourth electronic devices 420, 430, and 440. For example, the first electronic device 410 may compare the received or calculated hosting capabilities and select the electronic device having the highest hosting capability as a host device.

In an embodiment, the first electronic device 410 may acquire the hosting capabilities or the attribute values of the second to fourth electronic device 420, 430, and 440 during the communication connection in operation 710, or may receive the same from the second to fourth electronic device 420, 430, and 440. For example, the first electronic device 410 may request the hosting capabilities or the attribute values from the second to fourth electronic device 420, 430, and 440 to receive the same, or may receive the hosting capabilities or the attribute values automatically transmitted by the second to fourth electronic device 420, 430, and 440.

In operation 730, the first electronic device 410 may transmit the hosting information to the second electronic device 420 selected as a host device. For example, the hosting information may include at least one of data resource information, identification information of a host device and/or a client device for a data providing service, communication connection information of a client device, and/or the like. For example, the data resource information may be provided in the shape of a list in which identification information for a plurality of pieces of data is arranged. For example, the identification information of the client device may be provided in the shape of a list in which identification information for a plurality of electronic devices is arranged. For example, the identification information of the client device may include the identification information of the third and fourth electronic devices 430 and 440. A message including the hosting information may include information representing that the second electronic device 420 has been selected as a host device.

In an embodiment, the first electronic device 410 may transmit the message including the hosting information to the second to fourth electronic devices 420, 430, and 440.

In operation 740, the second electronic device 420 may register the data resource information as a virtual resource thereof. For example, the second electronic device 420 may store the data resource information in a memory (e.g., the memory 130) and operate as a host device that may correspond to a request of data within the data resource information from a client device.

In operation 745, the second to fourth electronic devices 420, 430, and 440 may establish communication connections (e.g., pairing, host/client connections, or the like) therebetween. In an embodiment, the second electronic device 420 may receive a request for subscribing to (or providing) data (or a request for a data providing service) or a registration request for data subscription from each or one or more of the third and fourth electronic devices 430, and 440. The second electronic device 420 may transmit a response to the subscription or registration request (e.g., permission for the subscription/registration or rejection of the subscription/registration) to the corresponding electronic device.

In operation 750, the first electronic device 410 may release the communication connection with the third electronic device 430 and/or fourth electronic device 440 after transmitting the hosting information to the second electronic device 420 or after receiving a response message for the message including the hosting information (e.g., a message including approval for the selection of the host device) from the second electronic device 420.

In operation 760, the first electronic device 410 may detect an event requiring the transmission of the subscription requested data. The event may be generated by at least one of the acquisition/modification/update of the subscription requested data, the expiration of a timer, a data request of the second electronic device 420, and/or the like.

In operation 771, the first electronic device 410 may transmit the subscription requested data to the second electronic device 420 selected as a host device.

In operation 772, the second electronic device 420 may transmit, to the third electronic device 430, the subscription requested data received from the first electronic device 410.

In operation 773, the second electronic device 420 may transmit, to the fourth electronic device 440, the subscription requested data received from the first electronic device 410.

Figure 8:
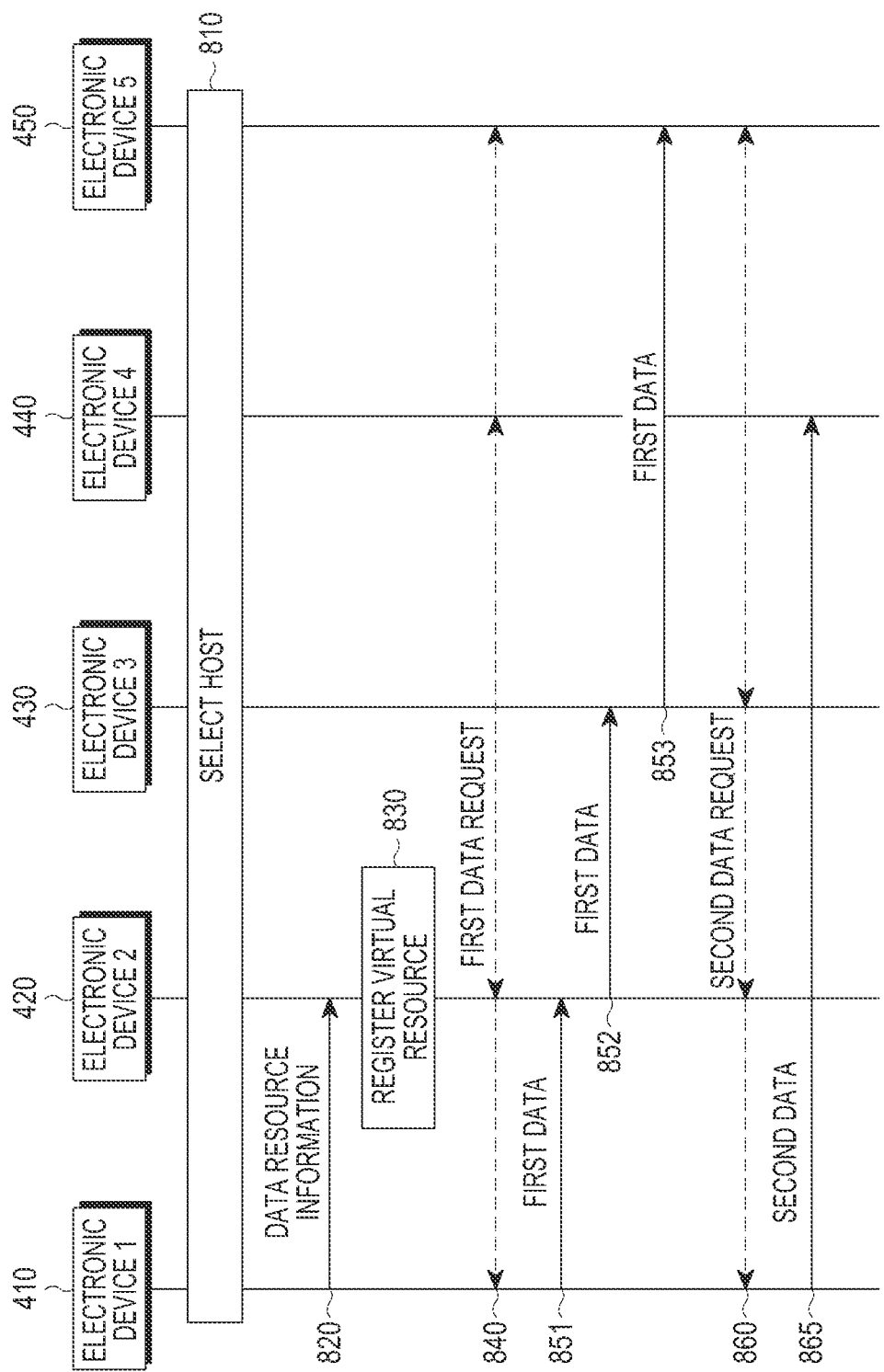

FIG. 8 is a signal flow diagram for explaining a data providing method according to an embodiment of the present disclosure.

Referring to FIG. 8, in operation 810, one of the second to fifth electronic devices 420, 430, 440, and 450 may be selected as a host device.

In an embodiment, the first electronic device 410 may select an arbitrary electronic device, the first connected electronic device, an electronic device of a preset device type, or an electronic device with the highest hosting capability, as a host device, from among the second to fifth electronic devices 420, 430, 440, and 450.

In an embodiment, after the exchange of capability information, one of the second to fifth electronic devices 420, 430, 440, and 450 may be selected as a host device. For example, the first electronic device 410 may transmit a message for requesting the selection of a host device to each or some of the second to fifth electronic devices 420, 430, 440, and 450. For example, the second electronic device 420 selected as a host device may transmit a message representing that the second electronic device 420 has been selected as a host device, to each or some of the first, third, fourth, and fifth electronic devices 410, 430, 440, and 450.

In operation 820, the first electronic device 410 may transmit data resource information to the second electronic device 420 selected as a host device. For example, the data resource information may include at least one of identification information of at least one piece of data, identification information of an application for processing the at least one piece of data, identification information of a service associated with the at least one piece of data, and/or the like. For example, the data resource information may be provided in the shape of a list in which identification information for a plurality of pieces of data is arranged.

In operation 830, the second electronic device 420 may register the data resource information as a virtual resource thereof. For example, the second electronic device 420 may store the data resource information in a memory (e.g., the memory 130) and operate as a host device that may correspond to a request of data within the data resource information from a client device.

In operation 840, the third electronic device 430 may request first data from the second electronic device 420, request the first data from each of the first and second electronic devices 410 and 420, or transmit a request message for the first data in a broadcasting manner according to the request of the fifth electronic device 450 or according to necessity thereof.

In operation 851, the first electronic device 410 may transmit the first data to the second electronic device 420 according to the request of the second or third electronic device 420 or 430 or according to automatic settings of the first electronic device 410.

In operation 852, the second electronic device 420 may transmit the first data to the third electronic device 430.

In operation 853, the third electronic device 430 may transmit the first data to the fifth electronic device 450.

In operation 860, the fourth electronic device 440 may request second data from the first electronic device 410, request the second data from each of the first and second electronic devices 410 and 420, or transmit a request message for the second data in a broadcasting manner according to the request of a client device or according to necessity thereof.

In operation 865, the first electronic device 410 may transmit the second data to the fourth electronic device 440 according to the request of the fourth electronic device 440 or according to automatic settings of the first electronic device 410. For example, the second electronic device 420 may ignore the request of the fourth electronic device 440 for the second data.

Figure 9:
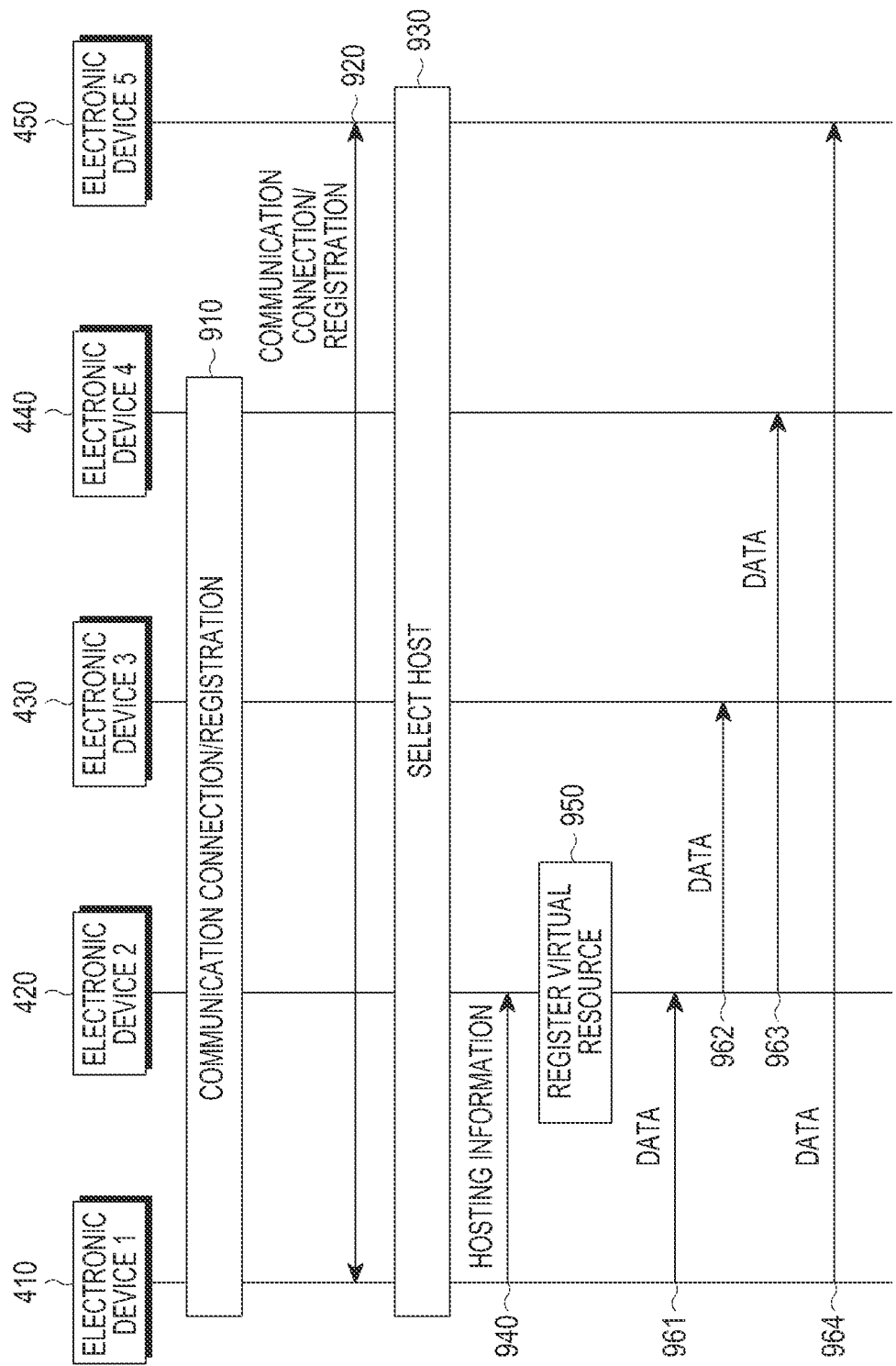

FIG. 9 is a signal flow diagram for explaining a data providing method according to an embodiment of the present disclosure.

Referring to FIG. 9, in operation 910, the first to fourth electronic devices 410, 420, 430, and 440 may establish communication connections (e.g., pairing, host/client connections, or the like) of a first communication type (e.g., Wi-Fi) therebetween. In an embodiment, the first electronic device 410 may receive a request for subscribing to (or providing) data (or a request for a data providing service) or a registration request for data subscription from each or one or more of the second to fourth electronic devices 420, 430, and 440. The first electronic device 410 may transmit a response to the subscription or registration request (e.g., permission for the subscription/registration or rejection of the subscription/registration) to the corresponding electronic device.

In operation 920, the first and fifth electronic devices 410 and 450 may establish communication connections (e.g., pairing, host/client connections, or the like) of a second communication type (e.g., Bluetooth) therebetween. In an embodiment, the first electronic device 410 may receive a request for subscribing to (or providing) data (or a request for a data providing service) or a registration request for data subscription from the fifth electronic device 450. The first electronic device 410 may transmit a response to the subscription or registration request (e.g., permission for subscription/registration or rejection of subscription/registration) to the fifth electronic device 450.

In operation 930, one of the second to fifth electronic devices 420, 430, 440, and 450 may be selected as a host device.

In an embodiment, the first electronic device 410 may select an arbitrary electronic device, the first connected electronic device, an electronic device of a preset device type, or an electronic device with the highest hosting capability, as a host device, from among the second to fifth electronic devices 420, 430, 440, and 450.

In an embodiment, after the exchange of capability information, one of the second to fifth electronic devices 420, 430, 440, and 450 may be selected as a host device. For example, the first electronic device 410 may transmit a message for requesting the selection of a host device to each or some of the second to fifth electronic devices 420, 430, 440, and 450. For example, the second electronic device 420 selected as a host device may transmit a message representing that the second electronic device 420 has been selected as a host device, to each or some of the first, third, fourth, and fifth electronic devices 410, 430, 440, and 450.

In operation 940, the first electronic device 410 may transmit hosting information to the second electronic device 420 selected as a host device. For example, the hosting information may include at least one of data resource information, identification information of a host device and/or a client device for a data providing service, communication connection information of a client device, and/or the like. For example, the data resource information may be provided in the shape of a list in which identification information for a plurality of pieces of data is arranged. For example, the identification information of the client device may be provided in the shape of a list in which identification information for a plurality of electronic devices is arranged. For example, the identification information of the client device may include the identification information of the third and fourth electronic devices 430 and 440. A message including the hosting information may include information representing that the second electronic device 420 has been selected as a host device.

In an embodiment, the first electronic device 410 may transmit the message including the hosting information to the second to fourth electronic devices 420, 430, and 440.

In operation 950, the second electronic device 420 may register the data resource information as a virtual resource thereof. For example, the second electronic device 420 may store the data resource information in a memory (e.g., the memory 130) and operate as a host device that may correspond to a request of data within the data resource information from a client device.

In operation 961, the first electronic device 410 may transmit data to the second electronic device 420 through a first communication module of a first communication type which is included in the first electronic device 410 according to the request of the second, third, or fourth electronic device 420, 430, or 440 or according to automatic settings of the first electronic device 410.

In operation 962, the second electronic device 420 may transmit the data to the third electronic device 430 through a first communication module of the first communication type which is included in the second electronic device 420.

In operation 963, the second electronic device 420 may transmit the data to the fourth electronic device 440 through the first communication module of the first communication type which is included in the second electronic device 420.

In operation 964, the first electronic device 410 may transmit the data to the fifth electronic device 450 through a second communication module of a second communication type which is included in the first electronic device 410.

Figure 10:
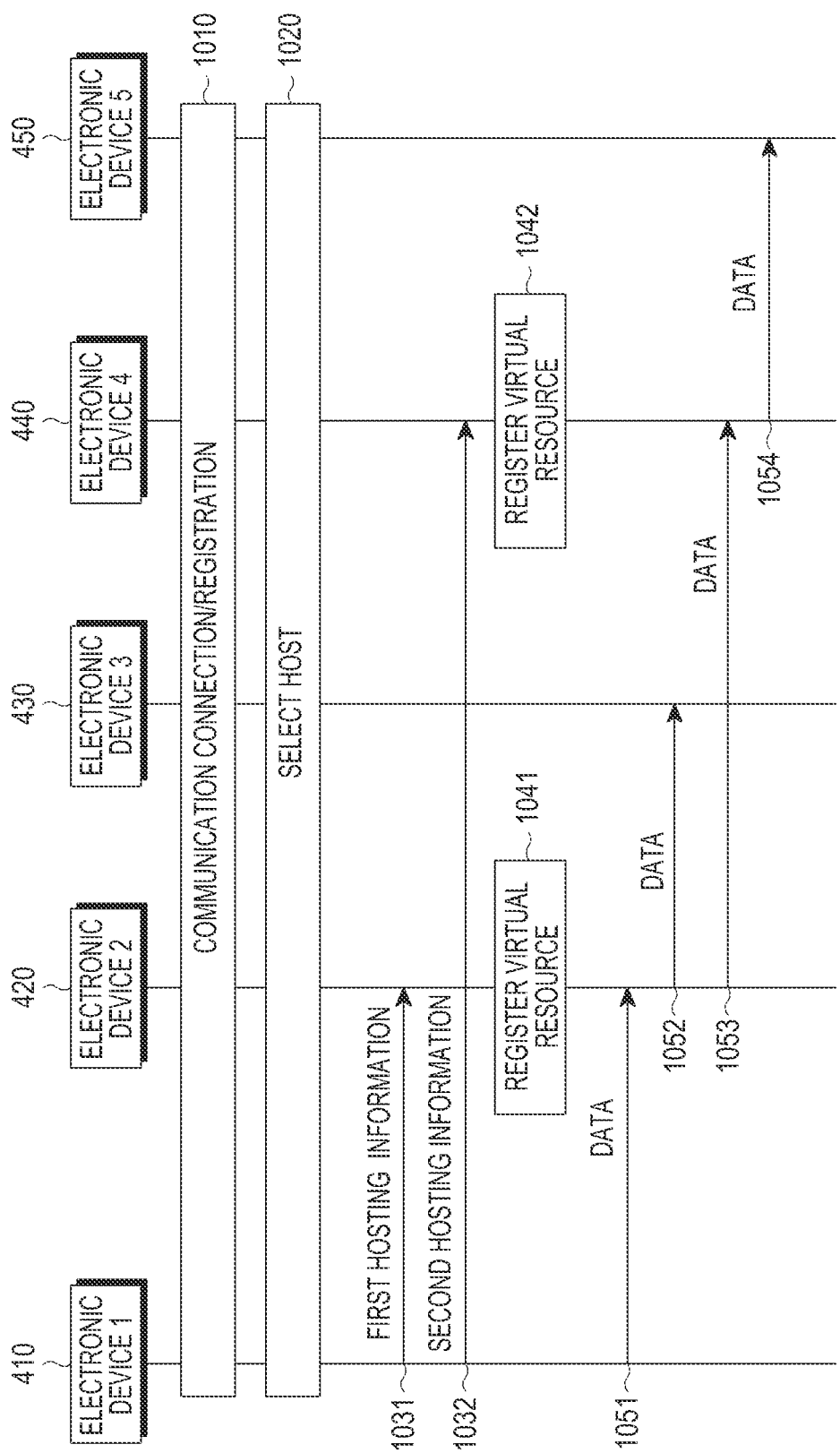

FIG. 10 is a signal flow diagram for explaining a data providing method according to an embodiment of the present disclosure.

Referring to FIG. 10, in operation 1010, the first to fifth electronic devices 410, 420, 430, 440, and 450 may establish communication connections (e.g., pairing, host/client connections, or the like) therebetween. In an embodiment, the first electronic device 410 may receive a request for subscribing to (or providing) data (or a request for a data providing service) or a registration request for data subscription from each or one or more of the second to fifth electronic devices 420, 430, 440, and 450. The first electronic device 410 may transmit a response to the subscription or registration request (e.g., permission for the subscription/registration or rejection of the subscription/registration) to the corresponding electronic device.

In operation 1020, some of the second to fifth electronic devices 420, 430, 440, and 450 may be selected as host devices.

In an embodiment, the first electronic device 410 may select arbitrary electronic devices, early connected electronic devices, electronic devices of a preset device type, or electronic devices with high hosting capabilities, as host devices, from among the second to fifth electronic devices 420, 430, 440, and 450.

In an embodiment, after the exchange of capability information, some of the second to fifth electronic devices 420, 430, 440, and 450 may be selected as host devices. For example, the first electronic device 410 may transmit a message for requesting the selection of host devices to each or some of the second to fifth electronic devices 420, 430, 440, and 450. For example, the second electronic device 420 selected as a first host device may transmit a message representing that the second electronic device 420 has been selected as a host device, to each or some of the first, third, and fourth electronic devices 410, 430, and 440. For example, the fourth electronic device 440 selected as a second host device may transmit a message representing that the fourth electronic device 440 has been selected as the second host device, to each or some of the first and fifth electronic devices 410 and 450.

In operation 1031, the first electronic device 410 may transmit first hosting information to the second electronic device 420 selected as the first host device.

In operation 1032, the first electronic device 410 may transmit second hosting information to the fourth electronic device 440 selected as the second host device.

For example, the hosting information may include at least one of data resource information, identification information of a host device and/or a client device for a data providing service, communication connection information of a client device, and/or the like. For example, the data resource information may be provided in the shape of a list in which identification information for a plurality of pieces of data is arranged. For example, the identification information of the client device may be provided in the shape of a list in which identification information for a plurality of electronic devices is arranged. For example, the identification information of a client device within the first hosting information may include the identification information of the third and fourth electronic devices 430 and 440. For example, the identification information of a client device within the second hosting information may include the identification information of the fifth electronic device 450. A message including the corresponding hosting information may include information representing that the corresponding electronic device has been selected as a host device.

In an embodiment, the first electronic device 410 may transmit the message including the hosting information to the second to fifth electronic devices 420, 430, 440, and 450.

In operation 1041, the second electronic device 420 may register first data resource information within the first hosting information as a virtual resource thereof.

In operation 1042, the fourth electronic device 440 may register second data resource information within the second hosting information as a virtual resource thereof.

For example, each of the second and fourth electronic devices 420 and 440 may store the corresponding data resource information in the corresponding memory (e.g., the memory 130) and operate as a host device that may correspond to a request of data within the corresponding data resource information from a client device.

In operation 1051, the first electronic device 410 may transmit data to the second electronic device 420 according to the request of at least one of the second to fifth electronic devices 420, 430, 440, and 450 or according to automatic settings of the first electronic device 410.

In operation 1052, the second electronic device 420 may transmit the data to the third electronic device 430.

In operation 1053, the second electronic device 420 may transmit the data to the fourth electronic device 440.

In operation 1054, the fourth electronic device 440 may transmit the data to the fifth electronic device 450.

Figure 11:
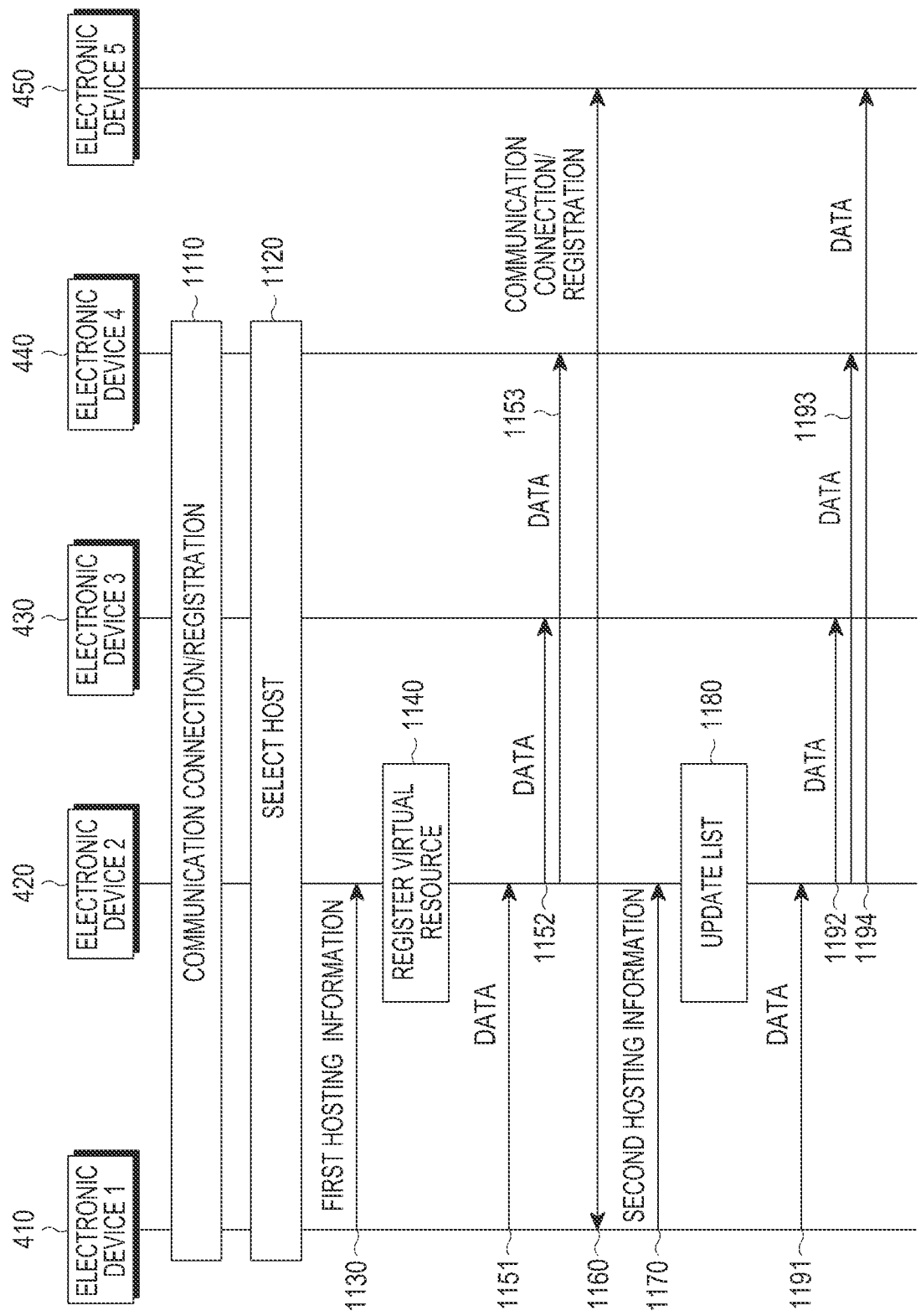

FIG. 11 is a signal flow diagram for explaining a data providing method according to various embodiments of the present disclosure.

Referring to FIG. 11, in operation 1110, the first to fourth electronic devices 410, 420, 430, and 440 may establish communication connections (e.g., pairing, host/client connections, or the like) of a first communication type (e.g., Wi-Fi) therebetween. In an embodiment, the first electronic device 410 may receive a request for subscribing to (or providing) data (or a request for a data providing service) or a registration request for data subscription from each or one or more of the second to fourth electronic devices 420, 430, and 440. The first electronic device 410 may transmit a response to the subscription or registration request (e.g., permission for the subscription/registration or rejection of the subscription/registration) to the corresponding electronic device.

In operation 1120, at least one of the second to fourth electronic devices 420, 430, and 440 may be selected as a host device.

In an embodiment, the first electronic device 410 may select an arbitrary electronic device, the first connected electronic device, an electronic device of a preset device type, or an electronic device with the highest hosting capability, as a host device, from among the second to fourth electronic devices 420, 430, and 440.

In an embodiment, after the exchange of capability information, one of the second to fourth electronic devices 420, 430, and 440 may be selected as a host device. For example, the first electronic device 410 may transmit a message for requesting the selection of a host device to each or some of the second to fourth electronic devices 420, 430, and 440. For example, the second electronic device 420 selected as a first host device may transmit a message representing that the second electronic device 420 has been selected as the first host device, to each or some of the first, third, and fourth electronic devices 410, 430, and 440.

In operation 1130, the first electronic device 410 may transmit first hosting information to the second electronic device 420 selected as the first host device.

For example, the hosting information may include at least one of data resource information, identification information of a host device and/or a client device for a data providing service, communication connection information of a client device, and/or the like. For example, the data resource information may be provided in the shape of a list in which identification information for a plurality of pieces of data is arranged. For example, the identification information of the client device may be provided in the shape of a list in which identification information for a plurality of electronic devices is arranged. For example, the identification information of a client device within the first hosting information may include the identification information of the third and fourth electronic devices 430 and 440.

In an embodiment, the first electronic device 410 may transmit the message including the hosting information to the second to fourth electronic devices 420, 430, and 440.

In operation 1140, the second electronic device 420 may register data resource information within the first hosting information as a virtual resource thereof.

For example, the second electronic device 420 may store the corresponding data resource information in a memory (e.g., the memory 130) and operate as a host device that may correspond to a request of data within the data resource information from a client device.

In operation 1151, the first electronic device 410 may transmit data to the second electronic device 420 through a first communication module of a first communication type included in the first electronic device 410 according to the request of at least one of the second to fourth electronic device 420, 430, and 440 or according to automatic settings of the first electronic device 410.

In operation 1152, the second electronic device 420 may transmit the data to the third electronic device 430 through a first communication module of the first communication type which is included in the second electronic device 420.

In operation 1153, the second electronic device 420 may transmit the data to the fourth electronic device 440 through the first communication module of the first communication type which is included in the second electronic device 420.

In operation 1160, the first and fifth electronic devices 410 and 450 may establish a communication connection (e.g., pairing, a host/client connection, or the like) of the first communication type therebetween. In an embodiment, the first electronic device 410 may receive a request for subscribing to (or providing) data (or a request for a data providing service) or a registration request for data subscription from the fifth electronic device 450. The first electronic device 410 may transmit a response to the subscription or registration request (e.g., permission for subscription/registration or rejection of subscription/registration) to the fifth electronic device 450.

In operation 1170, the first electronic device 410 may transmit second hosting information obtained by adding the identification information (and communication connection information) of the fifth electronic device 450 to the first hosting information, or update information including the identification information (and communication connection information) of the fifth electronic device 450 to the second electronic device 420.

In operation 1180, the second electronic device 420 may update a list of client devices which is stored in a memory. For example, the second electronic device 420 may add the identification information of the fifth electronic device 450 to the list of client devices, or may replace the list of client devices with a list of client devices within the second hosting information.

In operation 1191, the first electronic device 410 may transmit data to the second electronic device 420 through a first communication module of a first communication type included in the first electronic device 410 according to the request of at least one of the second to fifth electronic device 420, 430, 440, and 450 or according to automatic settings of the first electronic device 410.

In operation 1192, the second electronic device 420 may transmit the data to the third electronic device 430 through a first communication module of the first communication type which is included in the second electronic device 420.

In operation 1193, the second electronic device 420 may transmit the data to the fourth electronic device 440 through the first communication module of the first communication type which is included in the second electronic device 420.

In operation 1194, the second electronic device 420 may transmit the data to the fifth electronic device 450 through a second communication module of a second communication type (e.g., Bluetooth) which is included in the second electronic device 420.

Figure 12:
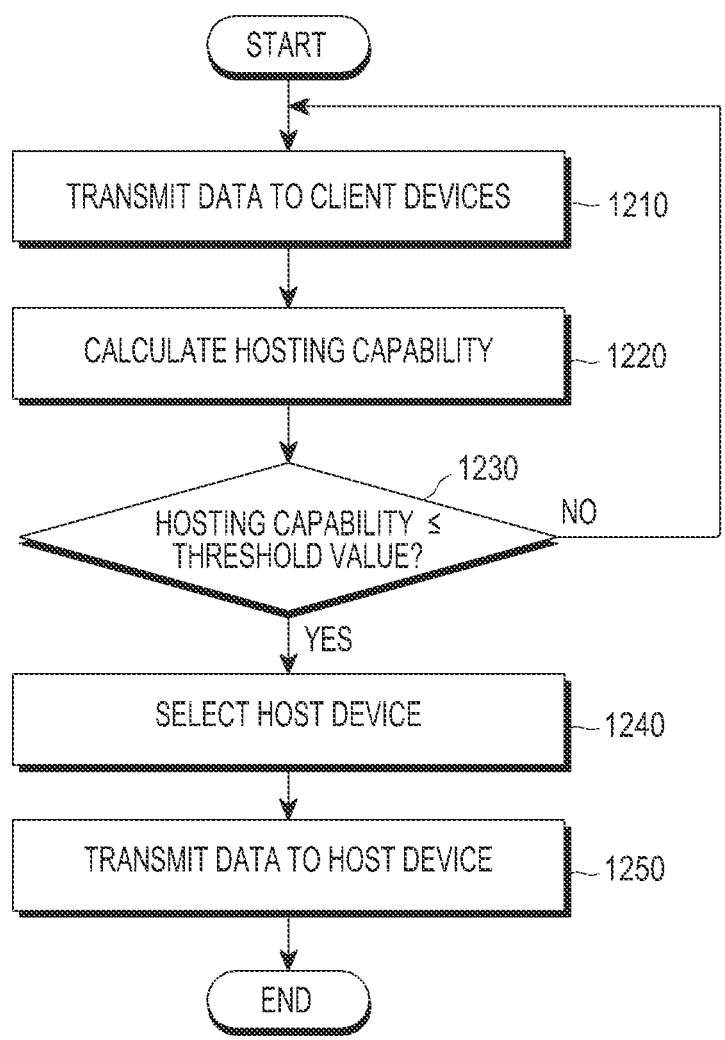

FIG. 12 is a flowchart for explaining a data providing method according to an embodiment of the present disclosure.

Referring to FIG. 12, in operation 1210, a first electronic device (e.g., the first electronic device 410) may transmit subscription requested data to a plurality of client devices.

In operation 1220, the first electronic device may calculate the hosting capability thereof. For example, the hosting capability may be calculated based on at least one of the amount or level of a residual battery, the amount or level of a residual memory space, the maximum number of electronic devices that may be hosted, a communication speed, and a data processing rate, or a combination of some or all of them. For example, the hosting capability may be calculated by (a*amount (level) of residual battery+b*amount (or level) of residual memory space+c*maximum number of electronic devices which may be hosted), where a, b, and c may be preset weight values.

In operation 1230, the first electronic device may compare the hosting capability with a preset threshold value. In cases where the hosting capability is greater than the threshold value, the first electronic device may repeat the operation 1210. In cases where the hosting capability is the threshold value or less, the first electronic device may perform operation 1240. Operations 1220 and 1230 may be performed according to a preset period or preset time intervals.

In operation 1240, the first electronic device may perform an operation of selecting a host device.

In an embodiment, the first electronic device may select an arbitrary device, the first connected device, a device of a preset device type, or a device having the highest hosting capability, as a host device, from among the client devices.

In an embodiment, after the exchange of capability information, one of the client devices may be selected as a host device. For example, the first electronic device 410 may transmit a message for requesting the selection of a host device to each or some of the client devices. For example, a device selected as a host device may transmit a message representing that the device has been selected as the host device, to the first electronic device and/or to each or some of the other client devices.

In operation 1250, the first electronic device may transmit the subscription requested data to the host device.

In an embodiment, the first electronic device may transmit hosting information to the host device prior to or at the same time as the operation 1250.

For example, the hosting information may include at least one of data resource information, identification information of a host device and/or a client device for a data providing service, communication connection information of a client device, and/or the like. For example, the data resource information may be provided in the shape of a list in which identification information for a plurality of pieces of data is arranged. For example, the identification information of the client device may be provided in the shape of a list in which identification information for a plurality of electronic devices is arranged.

In an embodiment, the first electronic device may transmit a message including the hosting information to the host device and each of the other client devices.

Figure 13:
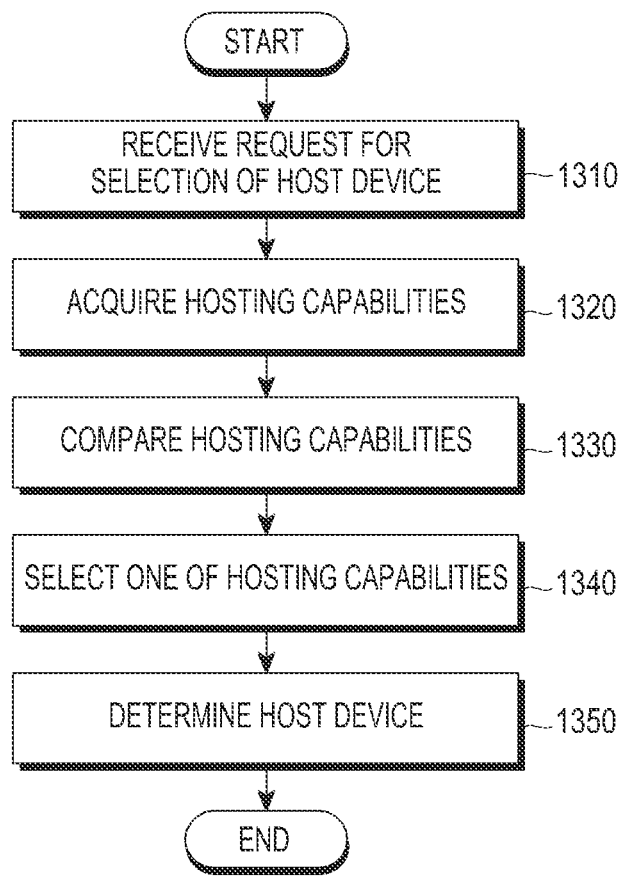

FIG. 13 is a flowchart for explaining a data providing method according to an embodiment of the present disclosure.

Referring to FIG. 13, in operation 1310, a second electronic device (e.g., the second electronic device 420) may receive a message for requesting the selection of a host device from a first electronic device (e.g., the first electronic device 410). The message may include information on at least one attribute value for calculating each hosting capability and/or identification information of candidate electronic devices that may be selected as a host device.

In operation 1320, the second electronic device may acquire a hosting capability or at least one attribute value for calculating the hosting capability from each of other candidate electronic devices. For example, the second electronic device may calculate the hosting capability of the corresponding candidate electronic device from the at least one attribute value received from each of the other candidate electronic devices.

In operation 1330, the second electronic device may compare the hosting capability thereof with the received or calculated hosting capabilities.

In operation 1340, the second electronic device may select one of the hosting capabilities.

For example, the second electronic device may select the highest hosting capability or a hosting capability in a preset threshold range from among the hosting capabilities. The preset threshold range may be a numerical range having upper and lower limits or a numerical range having only one threshold value.

In operation 1350, the second electronic device may determine or recognize the candidate electronic device corresponding to the selected hosting capability as a host device.

According to various embodiments, a method of providing data by a first electronic device may include: connecting with a plurality of electronic devices; transmitting information on data that may be provided to the plurality of electronic devices by the first electronic device, to a second electronic device from among the plurality of electronic devices that is selected as a host device for transmitting the data to at least one of the plurality of electronic devices instead of the first electronic device; and transmitting the data to the second electronic device.

According to various embodiments, the method may further include receiving, from each of the plurality of electronic devices, a request for subscribing to data or a registration request of the corresponding electronic device.

According to various embodiments, the method may further include transmitting a message for requesting the selection of the host device to each of the plurality of electronic devices or the second electronic device.

According to various embodiments, the selection of the host device may be based on the hosting capabilities of the plurality of electronic devices.

According to various embodiments, the method may further include transmitting a message for requesting the selection of the host device to each of the plurality of electronic devices or the second electronic device, wherein the selection of the host device may be based on the hosting capabilities of the plurality of electronic devices, and the message may include information on at least one attribute value for calculating each of the hosting capabilities.

According to various embodiments, the selection of the host device may be based on the hosting capabilities of the plurality of electronic devices, each of which may be calculated on the basis of at least one attribute value, wherein the at least one attribute value may include at least one of the amount or level of a residual battery, the amount or level of a residual memory space, the maximum number of electronic devices that may be hosted, a communication speed, and a data processing rate.

According to various embodiments, the method may further include selecting one of the plurality of electronic devices as the host device on the basis of the hosting capabilities of the plurality of electronic devices.

According to various embodiments, the method may further include: selecting one of the plurality of electronic devices as the host device on the basis of the hosting capabilities of the plurality of electronic devices; and transmitting the identification information of the host device to the plurality of electronic devices.

According to various embodiments, the method may further include: receiving, from each of the plurality of electronic devices, at least one attribute value of the corresponding electronic device; calculating the hosting capability of the corresponding electronic device on the basis of the at least one attribute value of the corresponding electronic device; and selecting one of the plurality of electronic devices as the host device on the basis of a comparison between the hosting capabilities of the plurality of electronic devices.

According to various embodiments, the method may further include receiving the identification information of the host device from one of the plurality of electronic devices.

According to various embodiments, the information on the data may include a list of the data which may be provided to the plurality of electronic devices by the first electronic device.

According to various embodiments, the transmitting of the information on the data to the second electronic device may include: receiving, from the second electronic device, a message for requesting a list of the data which may be provided to the plurality of electronic devices by the first electronic device; and transmitting the list of the data to the second electronic device in response to the request.

According to various embodiments, the transmitting of the data to the second electronic device may include: receiving, from the second electronic device, a request for transmitting the data; and transmitting the data to the second electronic device in response to the request.

According to various embodiments, the first electronic device may transmit, to the second electronic device, the identification information of the at least one electronic device to which the data is to be transmitted.

According to various embodiments, the first electronic device may transmit, to the second electronic device, a list of the at least one electronic device to which the data is to be transmitted.

According to various embodiments, the first electronic device may transmit, to the second electronic device, a first list of the at least one electronic device to which the data is to be transmitted, and the method may further include: receiving, from a third electronic device, a request for subscribing to data or a registration request of the corresponding electronic device; and transmitting a second list of the third electronic device and the at least one electronic device to the second electronic device.

According to various embodiments, the first electronic device may transmit, to the second electronic device, the identification information of the at least one electronic device to which the data will be transmitted and information for a communication connection with the at least one electronic device.

According to various embodiments, the method may further include automatically releasing the connection with the at least one electronic device after transmitting the information on the data to the second electronic device.

According to various embodiments, the method may further include: calculating the hosting capability of the first electronic device on the basis of at least one attribute value of the first electronic device; and comparing the hosting capability with a threshold value, wherein the first electronic device may start to transmit the information on the data to the second electronic device when the hosting capability is the threshold value or less.

According to various embodiments, the information on the data may include at least one of the identification information of the data, the identification information of an application for processing the data, and the identification information of a service associated with the data.

According to various embodiments, the method may further include detecting the occurrence of an event associated with the data, wherein the first electronic device may start to transmit the data to the second electronic device according to the occurrence of the event.

According to various embodiments, the first electronic device may include: a communication interface for a communication connection with another electronic device; and a processor configured to connect with a plurality of electronic devices through the communication interface, transmit information on data, which may be provided to the plurality of electronic devices by the first electronic device, through the communication interface to a second electronic device from among the plurality of electronic devices that is selected as a host device for transmitting the data to at least one of the plurality of electronic devices instead of the first electronic device, and transmit the data to the second electronic device through the communication interface.

According to various embodiments, the processor may be configured to receive a request for subscribing to data or a registration request of the corresponding electronic device through the communication interface from each of the plurality of electronic devices.

According to various embodiments, the processor may be configured to transmit a message for requesting the selection of the host device to each of the plurality of electronic devices or the second electronic device through the communication interface.

According to various embodiments, the selection of the host device may be based on the hosting capabilities of the plurality of electronic devices.

According to various embodiments, the processor may be configured to transmit a message for requesting the selection of the host device to each of the plurality of electronic devices or the second electronic device, wherein the selection of the host device may be based on the hosting capabilities of the plurality of electronic devices, and the message may include information on at least one attribute value for calculating each of the hosting capabilities.

According to various embodiments, the selection of the host device may be based on the hosting capabilities of the plurality of electronic devices, each of which may be calculated on the basis of at least one attribute value, wherein the at least one attribute value may include at least one of the amount or level of a residual battery, the amount or level of a residual memory space, the maximum number of electronic devices that may be hosted, a communication speed, and a data processing rate.

According to various embodiments, the processor may be configured to select one of the plurality of electronic devices as the host device on the basis of the hosting capabilities of the plurality of electronic devices.

According to various embodiments, the processor may be configured to select one of the plurality of electronic devices as the host device on the basis of the hosting capabilities of the plurality of electronic devices and transmit the identification information of the host device to the plurality of electronic devices.

According to various embodiments, the processor may be configured to receive at least one attribute value of the corresponding electronic device from each of the plurality of electronic devices, to calculate the hosting capability of the corresponding electronic device on the basis of the at least one attribute value of the corresponding electronic device, and to select one of the plurality of electronic devices as the host device on the basis of a comparison between the hosting capabilities of the plurality of electronic devices.

According to various embodiments, the processor may be configured to receive the identification information of the host device through the communication interface from one of the plurality of electronic devices.

According to various embodiments, the information on the data may include a list of the data which may be provided to the plurality of electronic devices by the first electronic device.

According to various embodiments, the processor may be configured to receive a message for requesting a list of the data, which may be provided to the plurality of electronic devices by the first electronic device, through the communication interface from the second electronic device and to transmit the list of the data through the communication interface to the second electronic device in response to the request.

According to various embodiments, the processor may be configured to receive a request for the transmission of the data through the communication interface from the second electronic device and to transmit the data through the communication interface to the second electronic device in response to the request.

According to various embodiments, the processor may be configured to transmit the identification information of the at least one electronic device to which the data is to be transmitted, through the communication interface to the second electronic device.

According to various embodiments, the processor may be configured to transmit a list of the at least one electronic device to which the data is to be transmitted, through the communication interface to the second electronic device.

According to various embodiments, the processor may be configured to transmit a first list of the at least one electronic device to which the data is to be transmitted, through the communication interface to the second electronic device, to receive a request for subscribing to data or a registration request of the corresponding electronic device from the third electronic device through the communication interface, and to transmit a second list of the third electronic device and the at least one electronic device through the communication interface to the second electronic device.

According to various embodiments, the processor may be configured to transmit the identification information of the at least one electronic device to which the data will be transmitted and information for a communication connection with the at least one electronic device through the communication interface to the second electronic device.

According to various embodiments, the processor may be configured to automatically release the connection with the at least one electronic device after transmitting the information on the data to the second electronic device.

According to various embodiments, the processor may be configured to calculate the hosting capability of the first electronic device on the basis of at least one attribute value of the first electronic device, to compare the hosting capability with a threshold value, and to start to transmit the information on the data to the second electronic device when the hosting capability is the threshold value or less.

According to various embodiments, the information on the data may include at least one of the identification information of the data, the identification information of an application for processing the data, and the identification information of a service associated with the data.

According to various embodiments, the processor may be configured to detect the occurrence of an event associated with the data and to start to transmit the data to the second electronic device according to the occurrence of the event.

According to various embodiments, a method of providing data by the second electronic device may include: connecting with the first electronic device; receiving, from the first electronic device, information on data that may be provided to the second electronic device selected as the host device by the first electronic device and at least one electronic device; receiving the data from the first electronic device; and transmitting the data to the at least one electronic device.

According to various embodiments, the method may further include transmitting a request for subscribing to data or a registration request of the second electronic device to the first electronic device.

According to various embodiments, the method may further include receiving a message for requesting the selection of a host device from the first electronic device.

According to various embodiments, the selection of the host device may be based on the hosting capabilities of the second electronic device and the at least one electronic device.

According to various embodiments, the method may further include receiving a message for requesting the selection of a host device from the first electronic device, wherein the selection of the host device may be based on the hosting capabilities of the second electronic device and the at least one electronic device, and the message may include information on at least one attribute value for calculating each of the hosting capabilities.

According to various embodiments, the selection of the host device may be based on the hosting capabilities of the second electronic device and the at least one electronic device, each of which may be calculated on the basis of at least one attribute value, wherein the at least one attribute value may include at least one of the amount or level of a residual battery, the amount or level of a residual memory space, the maximum number of electronic devices that may be hosted, a communication speed, and a data processing rate.

According to various embodiments, the method may further include receiving, from the first electronic device, a message representing that the second electronic device has been selected at the host device.

According to various embodiments, the method may further include: receiving information on at least one attribute value of the at least one electronic device from the at least one electronic device; calculating the hosting capability of the at least one electronic device on the basis of the at least one attribute value; and selecting one of the second electronic device and the at least one electronic device as a host device on the basis of the comparison between the hosting capabilities of the at least one electronic device and the second electronic device.

According to various embodiments, the information on the data may include a list of data which may be provided to the plurality of electronic devices by the first electronic device.

According to various embodiment, the receiving of the information on the data from the first electronic device may include: requesting, from the first electronic device, a list of data that may be provided to the second electronic device and the at least one electronic device by the first electronic device; and receiving the list of the data from the first electronic device.

According to various embodiments, the transmitting of the data to the at least one electronic device may include: receiving, from the at least one electronic device, a request for transmitting the data; and transmitting the data to the at least one electronic device in response to the request.

According to various embodiments, the information on the data may include a list of data that may be provided to the second electronic device and the at least one electronic device by the first electronic device, and the method may further include: receiving, from the at least one electronic device, a request for subscribing to data in the list or a registration request of the at least one electronic device; and transmitting a response to the subscription request or the registration request to the at least one electronic device.

According to various embodiments, the second electronic device may receive, from the first electronic device, the identification information of the at least one electronic device to which the data is to be transmitted.

According to various embodiments, the second electronic device may receive, from the first electronic device, a list of the at least one electronic device to which the data is to be transmitted.

According to various embodiments, the second electronic device may receive, from the first electronic device, a first list of the at least one electronic device to which the data is to be transmitted, and the method may further include receiving a second list of the third electronic device and the at least one electronic device from the first electronic device.

According to various embodiments, the second electronic device may receive, from the first electronic device, the identification information of the at least one electronic device to which the data will be transmitted and information for a communication connection with the at least one electronic device.

According to various embodiments, the method may further include automatically performing a connection with the at least one electronic device after receiving the information on the data from the first electronic device.

The information on the data may include at least one of the identification information of the data, the identification information of an application for processing the data, and the identification information of a service associated with the data.

According to various embodiments, the second electronic device may include: a communication interface for a communication connection with another electronic device; and a processor configured to connect with the first electronic device through the communication interface, to receive information on data that may be provided to the second electronic device selected as the host device by the first electronic device and at least one electronic device, through the communication interface from the first electronic device, to receive the data through the communication interface from the first electronic device, and transmit the data through the communication interface to the at least one electronic device.

According to various embodiments, the processor may be configured to transmit a request for subscribing to data or a registration request of the second electronic device through the communication interface to the first electronic device.

According to various embodiments, the processor may be configured to receive a message for requesting the selection of a host device through the communication interface from the first electronic device.

According to various embodiments, the selection of the host device may be based on the hosting capabilities of the second electronic device and the at least one electronic device.

According to various embodiments, the processor may be configured to receive a message for requesting the selection of a host device through the communication interface from the first electronic device, wherein the selection of the host device may be based on the hosting capabilities of the second electronic device and the at least one electronic device, and the message may include information on at least one attribute value for calculating each of the hosting capabilities.

According to various embodiments, the selection of the host device may be based on the hosting capabilities of the second electronic device and the at least one electronic device, each of which may be calculated on the basis of at least one attribute value, wherein the at least one attribute value may include at least one of the amount or level of a residual battery, the amount or level of a residual memory space, the maximum number of electronic devices that may be hosted, a communication speed, and a data processing rate.

According to various embodiments, the processor may be configured to receive a message representing that the second electronic device has been selected as the host device, through the communication interface from the first electronic device.

According to various embodiments, the processor may be configured to receive information on at least one attribute value of the at least one electronic device through the communication interface from the at least one electronic device, to calculate the hosting capability of the at least one electronic device on the basis of the at least one attribute value, and to select one of the second electronic device and the at least one electronic device as a host device on the basis of the comparison between the hosting capabilities of the at least one electronic device and the second electronic device.

According to various embodiments, the information on the data may include a list of data which may be provided to the plurality of electronic devices by the first electronic device.

According to various embodiments, the processor may be configured to request a list of data which may be provided to the second electronic device and the at least one electronic device by the first electronic device, through the communication interface from the first electronic device and to receive the list of the data through the communication interface from the first electronic device.

According to various embodiments, the processor may be configured to receive a request for the transmission of the data through the communication interface from the at least one electronic device and to transmit the data through the communication interface to the at least one electronic device in response to the request.

According to various embodiments, the information on the data may include a list of data that may be provided to the second electronic device and the at least one electronic device by the first electronic device, and the processor may be configured to receive a request for subscribing to data in the list or a registration request of the at least one electronic device through the communication interface from the at least one electronic device, and to transmit a response to the subscription request or the registration request through the communication interface to the at least one electronic device.

According to various embodiments, the processor may be configured to receive the identification information of the at least one electronic device to which the data is to be transmitted, through the communication interface from the first electronic device.

According to various embodiments, the processor may be configured to receive a list of the at least one electronic device to which the data is to be transmitted, through the communication interface from the first electronic device.

According to various embodiments, the processor may be configured to receive a first list of the at least one electronic device to which the data is to be transmitted, through the communication interface from the first electronic device and to receive a second list of the third electronic device and the at least one electronic device through the communication interface from the first electronic device.

According to various embodiments, the processor may be configured to receive the identification information of the at least one electronic device to which the data will be transmitted and information for a communication connection with the at least one electronic device through the communication interface from the first electronic device.

According to various embodiments, the processor may be configured to automatically connect with the at least one electronic device after receiving the information on the data from the first electronic device.

According to various embodiments, the information on the data may include at least one of the identification information of the data, the identification information of an application for processing the data, and the identification information of a service associated with the data.

Figure 14:
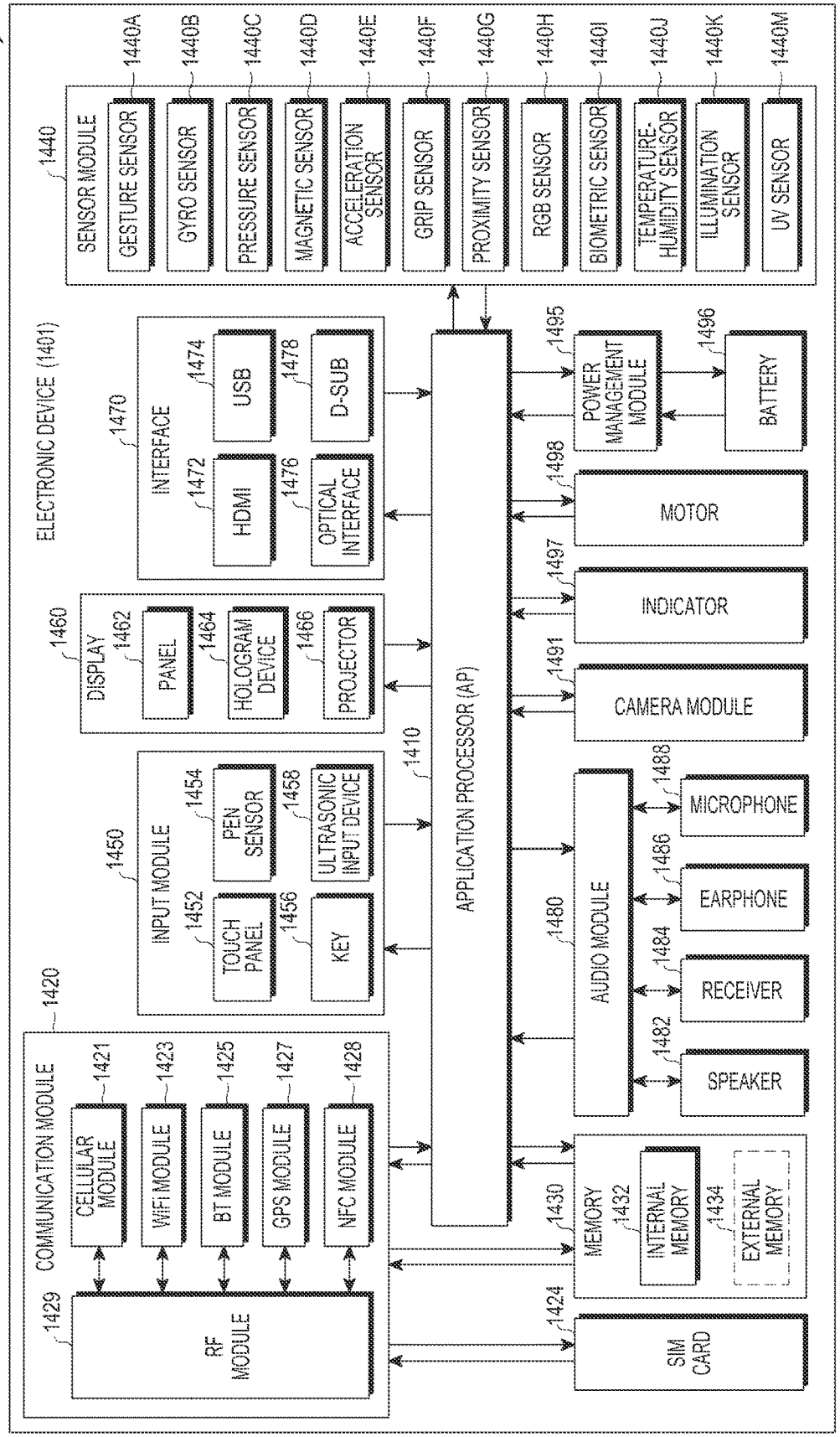
FIG. 14 is a block diagram of an electronic device according to an embodiment of the present disclosure.

FIG. 14 is a block diagram of an electronic device according to an embodiment of the present disclosure.

Referring to FIG. 14, in a block diagram 1400 an electronic device 1401 may include the entirety or a part of the electronic device 101 illustrated in FIG. 1. For example, the electronic device 101 illustrated in FIG. 1 may include the entirety or a part of the electronic device 1401. The electronic device 1401 may include at least one AP 1410, a communication module 1420, a Subscriber Identification Module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410, for example, may control a plurality of hardware or software elements connected thereto by driving an OS or an application program, and may perform a variety of data processing and calculations. The AP 1410 may be embodied, for example, as a system on chip (SoC). According to an embodiment, the AP 1410 may further include a graphic processing unit (GPU) and/or an image signal processor. The AP 1410 may also include at least some (e.g., a cellular module 1421) of the elements illustrated in FIG. 14. The AP 1410 may load instructions or data, received from at least one of the other elements (e.g., a non-volatile memory), in a volatile memory to process the loaded instructions or data, and may store various types of data in a non-volatile memory.

The communication module 1420 may have a configuration the same as or similar to that of the communication interface 170 of FIG. 1. The communication module 1420 may include, for example, a cellular module 1421, a Wi-Fi module 1423, a BT module 1425, a GPS module 1427, an NFC module 1428, and a radio frequency (RF) module 1429.

The cellular module 1421 may provide, for example, a voice call, a video call, a text service, or an Internet service through a communication network. According to an embodiment, the cellular module 1421 may distinguish and authenticate the electronic device 1401 in a communication network using a subscriber identification module (e.g., the SIM card 1424). According to an embodiment, the cellular module 1421 may perform at least some of the functions that the AP 1410 may provide. According to an embodiment, the cellular module 1421 may include a CP.

The Wi-Fi module 1423, the BT module 1425, the GPS module 1427, and the NFC module 1428 may include, for example, a processor for processing data transmitted/received through the corresponding module. According to some embodiment, at least some (two or more) of the cellular module 1421, the Wi-Fi module 1423, the BT module 1425, the GPS module 1427, and the NFC module 1428 may be included in one Integrated Chip (IC) or IC package.

The RF module 1429, for example, may transmit/receive a communication signal (e.g., an RF signal). The RF module 1429 may include, for example, a transceiver, a power amp module (PAM), a frequency filter, a low noise amplifier (LNA), or an antenna. According to another embodiment, at least one of the cellular module 1421, the Wi-Fi module 1423, the BT module 1425, the GPS module 1427, and the NFC module 1428 may transmit/receive an RF signal through a separate RF module.

The SIM card 1424 may include, for example, a card including a subscriber identification module and/or an embedded SIM. The SIM card 1424 may include unique identification information (e.g., an integrated circuit card identifier (ICCID)) or subscriber information (e.g., international mobile subscriber identity (IMSI)).

The memory 1430 (e.g., the memory 130) may include, for example, an internal memory 1432 or an external memory 1434. The internal memory 1432 may include, for example, at least one of a volatile memory (e.g., a dynamic random access memory (DRAM), a static RAM (SRAM), a synchronous dynamic RAM (SDRAM), and/or the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard disc drive, a solid state drive (SSD), and/or the like).

The external memory 1434 may further include a flash drive, for example, a compact flash (CF), a secure digital (SD), a micro secure digital (Micro-SD), a mini secure digital (Mini-SD), an extreme Digital (xD), a memory stick, and/or the like. The external memory 1434 may be functionally and/or physically connected to the electronic device 1401 through various interfaces.

The sensor module 1440, for example, may measure a physical quantity or sense an operating state of the electronic device 1401, and may convert the measured or sensed information into an electric signal. The sensor module 1440 may include, for example, at least one of a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., red, green, and blue (RGB) sensor), a biometric sensor 1440I, a temperature/humidity sensor 1440J, an illumination sensor 1440K, and an ultra violet (UV) sensor 1440M. Additionally or alternatively, the sensor module 1440 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one sensor included therein. In a certain embodiment, the electronic device 1401 may further include a processor configured to control the sensor module 1440 as a part of the AP 1410 or separately therefrom, and may control the sensor module 1440 while the AP 1410 is in a sleep state.

The input device 1450 may include, for example, a touch panel 1452, a (digital) pen sensor 1454, a key 1456, or an ultrasonic input device 1458. The touch panel 1452 may use, for example, at least one of a capacitive type, a resistive type, an infrared type, and an ultrasonic type. In addition, the touch panel 1452 may further include a control circuit. The touch panel 1452 may further include a tactile layer and provide a tactile reaction to a user.

The (digital) pen sensor 1454 may include, for example, a recognition sheet that is a part of the touch panel or is separate therefrom. The key 1456 may include, for example, a physical button, an optical key or a keypad. Through an input unit for generating an ultrasonic signal, the ultrasonic input unit 1458 may identify data by detecting acoustic waves with a microphone (e.g., the microphone 1488) of the electronic device 1401.

The display 1460 (e.g., the display 160) may include a panel 1462, a hologram device 1464, or a projector 1466. The panel 1462 may include a configuration the same as or similar to that of the display 160 of FIG. 1. The panel 1462 may be implemented to be, for example, flexible, transparent, or wearable. The panel 1462 may also be integrated with the touch panel 1452 as a single module. The hologram device 1464 may show a stereoscopic image in the air using interference of light. The projector 1466 may project light onto a screen to display an image. The screen may be located, for example, in the interior or on the exterior of the electronic device 1401. According to an embodiment, the display 1460 may further include a control circuit for controlling the panel 1462, the hologram device 1464, or the projector 1466.

The interface 1470 may include, for example, a high-definition multimedia interface (HDMI) 1472, a USB 1474, an optical interface 1476, or a D-subminiature (D-sub) 1478. The interface 1470 may be included, for example, in the communication interface 170 illustrated in FIG. 1. Additionally or alternatively, the interface 1470 may include, for example, a mobile high-definition link (MHL) interface, a SD card/multi-media card (MMC) interface, or an infrared data association (IrDA) standard interface.

The audio module 1480, for example, may bilaterally convert a sound and an electric signal. At least some elements of the audio module 1480 may be included, for example, in the input/output interface 140 illustrated in FIG. 1. The audio module 1480 may process voice information input or output, for example, through a speaker 1482, a receiver 1484, earphones 1486, or the microphone 1488.

The camera module 1491 may shoot a still image and a moving image. According to an embodiment, the camera module 1491 may include one or more image sensors (e.g., a front sensor or a back sensor), a lens, an image signal processor (ISP), or a flash (e.g., an LED or a xenon lamp).

The power management module 1495 may manage, for example, the power of the electronic device 1401. According to an embodiment, the power management module 1495 may include a power management integrated circuit (PMIC), a charger IC, or a battery or fuel gauge. The PMIC may have a wired and/or wireless charging scheme. Examples of the wireless charging method may include a magnetic resonance scheme, a magnetic induction scheme, or an electromagnetic scheme, and an additional circuit for wireless charging, such as a coil loop circuit, a resonance circuit, a rectifier circuit, and/or the like, may be further included. The battery gauge may measure, for example, the residual quantity of the battery 1496, or voltage, current, or temperature while charging. The battery 1496 may include, for example, a rechargeable battery or a solar battery.

The indicator 1497 may indicate a particular state of the electronic device 1401 or a part thereof (e.g., the AP 1410), for example, a booting state, a message state, a charging state, or the like. The motor 1498 may convert an electric signal into a mechanical vibration, and may generate a vibration or haptic effect. Although not illustrated, the electronic device 1401 may include a processing device (e.g., a GPU) for mobile TV support. The processing unit for mobile TV support may process media data according to a standard such as digital multimedia broadcasting (DMB), digital video broadcasting (DVB), media flow, or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (e.g., modules or functions thereof) or the method (e.g., operations) according to the present disclosure may be implemented by a command stored in a computer-readable storage medium in a programming module form. When he command is executed by one or more processors (e.g., the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a read only memory (ROM), a random access memory (RAM), a flash memory), and/or the like. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, provided is a recording medium having instructions stored therein. The instructions are set to make at least one processor perform at least one operation when the instructions are executed by the at least one processor, in which the at least one operation may include: connecting with a plurality of electronic devices; transmitting information on data that may be provided to the plurality of electronic devices by the first electronic device, to a second electronic device from among the plurality of electronic devices which is selected as a host device for transmitting the data to at least one of the plurality of electronic devices instead of the first electronic device; and transmitting the data to the second electronic device.

According to various embodiments, provided is a recording medium having instructions stored therein. The instructions are set to make at least one processor perform at least one operation when the instructions are executed by the at least one processor, in which the at least one operation may include: connecting with a first electronic device; receiving, from the first electronic device, information on data that may be provided to the second electronic device selected as a host device by the first electronic device and at least one electronic device; receiving the data from the first electronic device; and transmitting the data to the at least one electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing data by a first electronic device, the method comprising:
    connecting to a plurality of electronic devices;
    identifying, by the first electronic device, a second electronic device from among the plurality of electronic devices as a host device for transmitting data received from the first electronic device to at least one of the plurality of electronic devices instead of the first electronic device;
    transmitting, by the first electronic device, first information about data that is available to be provided to the plurality of electronic devices by the first electronic device, to the second electronic device, wherein the first information includes a list of the data that is available to be provided;
    transmitting, from the first electronic device to the at least one of the plurality of electronic devices, information identifying the second electronic device as the host device;
    receiving, by the first electronic device, a message for requesting at least one of the data from the second electronic device; and
    in response to identifying an occurrence of an event related to the at least one of the data requested by the second electronic device, transmitting, from the first electronic device, the at least one of the data to the second electronic device such that the at least one of the data is transmitted from the second electronic device to the at least one of the plurality of electronic devices.

2. The method of claim 1, further comprising:
    receiving, from each of the plurality of electronic devices, a request for subscribing to the data or a registration request of each of the plurality of electronic devices.

3. The method of claim 1, further comprising:
    transmitting a first message for requesting a selection of the host device to each of the plurality of electronic devices,
    wherein the selection of the host device is based on hosting capabilities of the plurality of electronic devices, and
    wherein the first message comprises second information related to at least one attribute value for calculating each of the hosting capabilities.

4. The method of claim 1,
    wherein a selection of the host device is based on hosting capabilities of the plurality of electronic devices, the hosting capabilities being calculated based on at least one attribute value, and
    wherein the at least one attribute value comprises at least one of an amount or level of a residual battery, an amount or level of a residual memory space, a maximum number of electronic devices that may be hosted, a communication speed, or a data processing rate.

5. The method of claim 1, further comprising:
    selecting the second electronic device as the host device based on hosting capabilities of the plurality of electronic devices.

6. The method of claim 1, further comprising:
    receiving, from each of the plurality of electronic devices, at least one attribute value of the plurality of electronic devices;
    calculating a hosting capability of the plurality of electronic devices based on the at least one attribute value of the plurality of electronic devices; and
    selecting the second electronic device as the host device based on a comparison between hosting capabilities of the plurality of electronic devices.

7. The method of claim 1, wherein the transmitting of the first information to the second electronic device comprises:
    receiving, from the second electronic device, a first message for requesting the list of the data; and transmitting the first information comprising the list of the data to the second electronic device in response to the first message.

8. The method of claim 1, further comprising:
calculating a hosting capability of the first electronic device based on at least one attribute value of the first electronic device; and
comparing the hosting capability with a threshold value,
wherein the first electronic device starts to transmit the first information for identifying the data having at least one type to the second electronic device when the hosting capability is equal to the threshold value or less.

9. A first electronic device comprising:
a communication interface configured to create a communication connection with another electronic device; and
at least one processor configured to:
connect to a plurality of electronic devices,
identify a second electronic device from among the plurality of electronic devices as a host device, the host device being capable of transmitting data received from the first electronic device to at least one of the plurality of electronic devices instead of the first electronic device,
control the communication interface to transmit first information about data that is available to be provided to the plurality of electronic devices by the first electronic device, to the second electronic device, wherein the first information includes a list of the data that is available to be provided,
control the communication interface to transmit, to the at least one of the plurality of electronic devices, information identifying the second electronic device as the host device,
control the communication interface to receive a message for requesting at least one of the data from the second electronic device, and
in response to identifying an occurrence of an event related to the at least one of the data requested by the second electronic device, control the communication interface to transmit the at least one of the data to the second electronic device such that the at least one of the data is transmitted from the second electronic device to the at least one of the plurality of electronic devices.

10. The first electronic device of claim 9, wherein the at least one processor is further configured to control the communication interface to receive a request for subscribing to the data or a registration request of each of the plurality of electronic devices through the communication interface.

11. The first electronic device of claim 9,
wherein the at least one processor is further configured to transmit a first message for requesting a selection of the host device to each of the plurality of electronic devices,
wherein the selection of the host device is based on hosting capabilities of the plurality of electronic devices, and
wherein the first message comprises second information related to at least one attribute value for calculating the hosting capabilities.

12. The first electronic device of claim 9,
wherein a selection of the host device is based on hosting capabilities of the plurality of electronic devices, the hosting capabilities being calculated based on at least one attribute value, and
wherein the at least one attribute value comprises at least one of an amount or level of a residual battery, an amount or level of a residual memory space, a maximum number of electronic devices that may be hosted, a communication speed, or a data processing rate.

13. The first electronic device of claim 9, wherein the at least one processor is further configured to:
select the second electronic device as the host device based on hosting capabilities of the plurality of electronic devices.

14. The first electronic device of claim 9, wherein the at least one processor is further configured to:
control the communication interface to receive at least one attribute value of the plurality of electronic devices from each of the plurality of electronic devices,
calculate a hosting capability of the plurality of electronic devices based on the at least one attribute value of the plurality of electronic devices, and
select one of the plurality of electronic devices as the host device based on a comparison between hosting capabilities of the plurality of electronic devices.

15. The first electronic device of claim 9, wherein the at least one processor is further configured to:
control the communication interface to receive, from the second electronic device, a message for requesting the list of the data, and
control the communication interface to transmit the first information comprising the list of the data to the second electronic device in response to the request.

16. The first electronic device of claim 9, wherein the at least one processor is further configured to:
calculate a hosting capability of the first electronic device based on at least one attribute value of the first electronic device,
compare the hosting capability with a threshold value, and
control the communication interface to start to transmit the first information for identifying the data having at least one type to the second electronic device when the hosting capability is equal to the threshold value or less.

17. The first electronic device of claim 9, wherein the first information transmitted from the first electronic device to the second electronic device allows the second electronic device to virtually operate as the first electronic device.

18. The first electronic device claim 17, wherein the list of the data included in the first information includes at least one of identification information of at least one piece of the data, identification information of an application for processing the at least one piece of the data, or identification information of a service associated with the at least one piece of the data.

19. The method of claim 1, wherein the list of the data included in the first information allows the second electronic device to virtually operate as the first electronic device.

20. The method of claim 19, wherein the list of the data included in the first information includes at least one of identification information of at least one piece of the data, identification information of an application for processing the at least one piece of the data, or identification information of a service associated with the at least one piece of the data.

* * * * *